United States Patent [19]
Phan et al.

[11] Patent Number: 5,369,345
[45] Date of Patent: Nov. 29, 1994

[54] METHOD AND APPARATUS FOR ADAPTIVE CONTROL

[75] Inventors: Duc T. Phan; Tien Q. Le, both of Santa Clara County, Calif.

[73] Assignee: Seagate Technology, Inc., Scotts Valley, Calif.

[21] Appl. No.: 867,319

[22] Filed: Apr. 10, 1992

Related U.S. Application Data

[63] Continuation-in-part of Ser. No. 861,069, Mar. 31, 1992.

[51] Int. Cl.$^5$ ............................................. G05B 13/00
[52] U.S. Cl. ...................................................... 318/561
[58] Field of Search .......................................... 318/561

[56] References Cited
U.S. PATENT DOCUMENTS

| | | | |
|---|---|---|---|
| 4,691,152 | 9/1987 | Ell et al. | 318/616 |
| 4,724,370 | 2/1988 | Moraru et al. | 318/561 |
| 4,816,941 | 3/1989 | Edel et al. | 360/78.12 |
| 4,950,967 | 8/1990 | Sakamoto et al. | 318/561 |
| 5,049,795 | 9/1991 | Moulds, III | 318/561 |
| 5,063,454 | 11/1991 | Hashimoto | 360/78.04 |
| 5,128,812 | 7/1992 | Uno | 360/78.06 |
| 5,155,422 | 10/1992 | Sidman et al. | 318/560 |
| 5,206,570 | 4/1993 | Hargarten et al. | 318/561 |

*Primary Examiner*—William M. Shoop, Jr.
*Assistant Examiner*—Karen Masih
*Attorney, Agent, or Firm*—Flehr, Hohbach, Test, Albritton & Herbert

[57] ABSTRACT

Methods and apparatus for controlling a plant are described. The control methods are adaptive and compensate for changes in plant component characteristics and plant environment, and are applicable to systems having a bias force. The methods are described in relation to a sampled-data control system for a computer disc drive servo actuator apparatus but the control methods are independent of plant type. Methods for extending a linear measurement range of a position sensor, for generating a plant gain constant, for measuring plant phase, for measuring plant resonance frequencies and compensating for the effects of plant resonance, and for switching between different modes depending on characteristics of the applied control value are described. These methods may be used separately or in combination to achieve the desired control.

64 Claims, 17 Drawing Sheets

| TRACK NUMBER (GRAY CODED, MODULE-74) | | | | |
|---|---|---|---|---|
| 0 0 1 1 0 0 1 – 0  | 0 1 1 1 1 0 1 –20 | 1 1 0 0 1 0 0 –40 | 1 1 1 0 0 1 1 –60 |
| 0 0 1 1 0 1 1 – 1  | 0 1 1 1 1 1 1 –21 | 1 1 0 1 1 0 0 –41 | 1 0 1 0 0 1 1 –61 |
| 0 0 1 1 0 1 0 – 2  | 0 1 1 1 1 1 0 –22 | 1 1 0 1 1 0 1 –42 | 1 0 1 0 0 1 0 –62 |
| 0 0 1 1 1 1 0 – 3  | 0 1 1 1 0 1 0 –23 | 1 1 0 1 1 1 1 –43 | 1 0 1 0 1 1 0 –63 |
| 0 0 1 1 1 1 1 – 4  | 0 1 1 1 0 1 1 –24 | 1 1 0 1 1 1 0 –44 | 1 0 1 0 1 1 1 –64 |
| 0 0 1 1 1 0 1 – 5  | 0 1 1 1 0 0 1 –25 | 1 1 0 1 0 1 0 –45 | 1 0 1 0 1 0 1 –65 |
| 0 0 1 1 1 0 0 – 6  | 0 1 0 1 0 0 1 –26 | 1 1 0 1 0 1 1 –46 | 1 0 1 0 1 0 0 –66 |
| 0 0 1 0 1 0 0 – 7  | 0 1 0 1 0 1 1 –27 | 1 1 0 1 0 0 1 –47 | 1 0 1 1 1 0 0 –67 |
| 0 0 1 0 1 0 1 – 8  | 0 1 0 1 0 1 0 –28 | 1 1 1 1 0 0 1 –48 | 1 0 1 1 1 0 1 –68 |
| 0 0 1 0 1 1 1 – 9  | 0 1 0 1 1 1 0 –29 | 1 1 1 1 0 1 1 –49 | 1 0 1 1 1 1 1 –69 |
| 0 0 1 0 1 1 0 –10  | 0 1 0 1 1 1 1 –30 | 1 1 1 1 0 1 0 –50 | 1 0 1 1 1 1 0 –70 |
| 0 0 1 0 0 1 0 –11  | 0 1 0 1 1 0 1 –31 | 1 1 1 1 1 1 0 –51 | 1 0 1 1 0 1 0 –71 |
| 0 0 1 0 0 1 1 –12  | 0 1 0 1 1 0 0 –32 | 1 1 1 1 1 1 1 –52 | 1 0 1 1 0 1 1 –72 |
| 0 1 1 0 0 1 1 –13  | 0 1 0 0 1 0 0 –33 | 1 1 1 1 1 0 1 –53 | 1 0 1 1 0 0 1 –73 |
| 0 1 1 0 0 1 0 –14  | 0 1 0 0 1 0 1 –34 | 1 1 1 1 1 0 0 –54 | |
| 0 1 1 0 1 1 0 –15  | 0 1 0 0 1 1 1 –35 | 1 1 1 0 1 0 0 –55 | |
| 0 1 1 0 1 1 1 –16  | 0 1 0 0 1 1 0 –36 | 1 1 1 0 1 0 1 –56 | |
| 0 1 1 0 1 0 1 –17  | 1 1 0 0 1 1 0 –37 | 1 1 1 0 1 1 1 –57 | |
| 0 1 1 0 1 0 0 –18  | 1 1 0 0 1 1 1 –38 | 1 1 1 0 1 1 0 –58 | |
| 0 1 1 1 1 0 0 –19  | 1 1 0 0 1 0 1 –39 | 1 1 1 0 0 1 0 –59 | |

FIG. 4

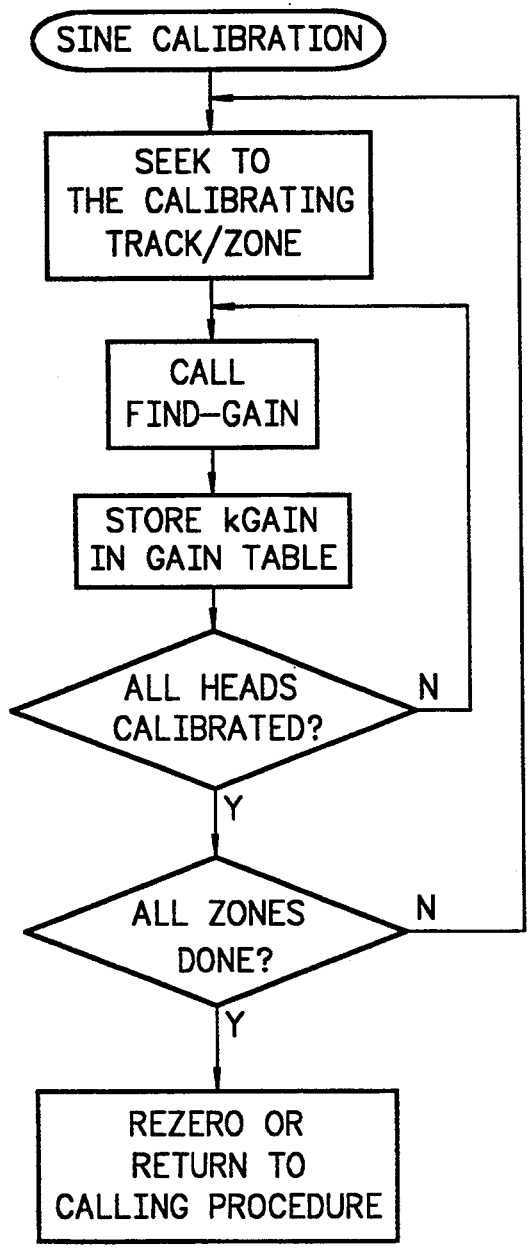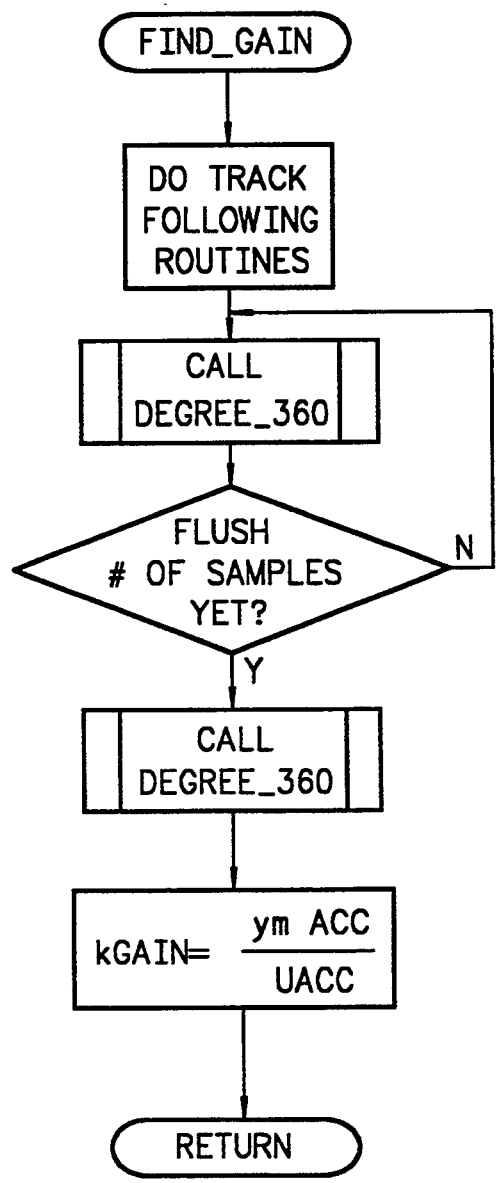
FIG. 16A
FIG. 16B

METHOD AND APPARATUS FOR ADAPTIVE CONTROL

CROSS REFERENCE TO RELATED APPLICATIONS

This application is a continuation-in-part of application Ser. No. 07/861,069, filed Mar. 31, 1992.

BACKGROUND OF THE INVENTION

1. Field Of the Invention

This invention relates generally to the field of adaptive digital control systems which maintain closed-loop performance despite changes in the open-loop system and the presence of applied bias forces, and more particularly to adaptive bias compensating digital control systems for magnetic disc storage devices.

2. Description of the Related Art

Magnetic disc storage device are used in data processing systems for storing relatively large amounts of information that can generally be accessed in milliseconds. Storage or retrieval of information from the disc is accomplished by a transducer read/write head that generates a signal based on the magnetic state of the disc proximate the head; or alternatively generates a magnetic field based on an applied signal. The high information storage density and the requirement for relatively fast data access imposes relatively severe constraints on read/write transducer head positioning system. Accurately positioning the transducer head is made even more difficult when the hardware components change due to age or environment. Magnetic disc storage devices incorporate a closed-loop control system which generally use current system state information in conjunction with a commanded position and/or velocity to move the head in some optimal or near-optimal manner. To some extent some control systems may attempt to adjust or compensate for certain changes in the hardware or environment. When a control system cannot adequately compensate for some system or environmental change, then these changes must be reduced to acceptable levels by some other means, such as by providing more precise tolerance hardware component. Positional accuracy, noise and disturbance rejection, robustness to hardware plant and environmental change, and the response time needed to achieve that commanded position are indicators of performance. There may generally be a tradeoff between each of these factors. Without using tight tolerance components, the performance of conventional controls systems applied to magnetic disc storage devices has been limited and does not provide the desired level of performance.

FIG. 1 is an illustration which shows an example of a disc storage device. Structurally, a typical storage device comprises a rotating magnetizable disc medium having at least one magnetizable surface 702, in the form of an assembly of one or more stacked platters 701, on which data is magnetically sensed and/or recorded in addressable sectors 703 located on circular data tracks 704. The disc assembly 706 is mounted on a drive spindle 707 in the storage device that rotates at a substantially constant speed. The storage device also includes one or more transducers or read/write heads 708, associated with each surface of the disc. The transducers are mounted on an arm 709 of a movable transducer or actuator arm carriage 710 which is linked to a servo actuator 711. A flexible cable 712 extends from the transducer head 708 along the actuator arm 709 with electrically connect the transducer head 708 to electrical read/write circuitry (not shown). The servo by way of the servo controller responds to a command from the interface to perform a track seek. The carriage is actuated in a controlled fashion to move all the mechanically coupled data heads in unison radially over the disc surfaces to position any one of the data heads over a selected track. Since all the transducer heads on the carriage move together, the device also includes head selection control circuitry that selects one of the read/write transducer heads 708 to perform a data transfer operation.

In a typical digital servo, the measurement that the digital controller reads from the heads consists of a coarse position indicator value such as the track crossing information, and a fine position indicator value such as the position error signal (PES) generated by demodulating pre-recorded servo information stored on the disc. The PES indicates the position error of the head away from the nearest track centerline. There are two primary types of servo drive systems: those incorporating a dedicated servo disc which stores only servo information but no user data, and sector servo systems wherein the servo code is recorded interspersed with user data. In a dedicated type servo drive system, the pre-recorded servo data is written on a dedicated disc platter surface. The track crossing information may be derived directly from the PES because of high PES sampling rate. However, in a sector servo, the servo data is written on the data discs interspersed between the read/write data segments, thus it is not possible to derive track crossing information from the PES because the system must recognize each track crossing and the heads could cross many tracks between PES samples.

In typical disc drives, the actuator is subject to bias components, generally at low frequency, which move the actuator away from the desired position during seek and track following modes. The bias could consist of but is not limited to: force from the flexible cable which is attached to the actuator coil, friction in the actuator bearings, windage due to air circulating inside the head disc assembly, gravitational force on the carriage assembly if the actuator is not perfectly balanced, and system electronic offsets which results in a constant current to be applied to the actuator with zero control effort.

The actuator and heads are electro-mechanical components and their parameters, such as torque constant, inertia, core width, and head gap, are subject to variation. In addition, other system parameters that can vary are AGC loop gain, servo demodulator gain, A/D converter gain, D/A converter gain, and servo power amplifier transconductance gain. The variation can be due to component tolerance, temperature, humidity, wear and aging.

In a conventional closed-loop system, it generally may not be possible to maintain the same nominal performance with the variations of system parameters that occur. One way to deal with this problem is to decrease the performance level so that a disc drive with worst-case components and environment can perform acceptably. Another way is to tighten component tolerance to achieve the desired performance, but this may increase costs substantially. Neither of these alternatives are particularly attractive. The control methods and apparatus according to the present invention overcomes these limitations.

Unlike other adaptive control techniques, the present invention will work with a system having an arbitrary bias force. The present invention identifies the plant gain constant while track following, whereas the conventional methods do it only while seeking. The adaptive algorithm described in this invention does not require or assume the system to be bias-free or have constant bias characteristics. The bias force can be arbitrary and slowly varying and its magnitude can be different in the forward and reverse seek directions. The calibration can be done one track at a time if necessary or desirable.

These techniques may require that the magnitude of the bias force be insensitive to seek direction, and provide an adaptive algorithm only for a second-order plant. See, for example, U.S. Pat. No. 4,697,127 issued to Stich et al., or U.S. Pat. No. 4,679,103 issued to Workman, and herein incorporated by reference. Both of these requirements do not apply to the present invention. The adaptive method of the current invention will work with any plant that can be adequately modeled as a linear system. Therefore, it will work with a plant of any order.

An objective of this invention is to provide an adaptive sampled data control system for a disc drive head positioning system.

It is also an object of this invention to provide an adaptive method which is independent of the control method used in the main control system and drive code.

It is a further object of this invention to provide an adaptive control system that generates a plant gain constant for each of the transducer read/write heads.

It is a further object of this invention to enable the firmware to measure the servo system's resonance frequencies assuming high enough sampling rate so that the resonance may be compensated for.

It is a further object of this invention to disclose an adaptive digital control system that has an estimator algorithm to estimate the position and velocity of the head, and the bias of the system.

It is a further objective of this invention to provide a method of calibration to deal with variations in components and environmental characteristics to maintain optimal performance without increasing cost.

It is a further object of the invention to provide a position measurement technique which extends the linear range of the position sensor across a plurality of servo tracks.

It is a further object of the invention to provide an apparatus that provides the digital adaptive control to a magnetic disc storage device or similar electro-magnetic plant.

SUMMARY OF THE INVENTION

The invention describes adaptive control methods for controlling an electro-mechanical plant whose characteristics change as a result of component wear, manufacturing variability, and the like, and environmental conditions. Such adaptive control provides for precision control of an electro-mechanical actuator, such as a computer disc read head transducer, which generally cannot be achieved without extremely high precision components. The adaptive control system according to this invention is applicable to systems having applied bias forces, and to plants having a broad range of characteristics.

In one aspect the invention provides a method of adaptively calibrating a plant gain for regions of a disc and for each of the transducer heads linked to an actuator, by determining a plant gain adjustment factor. This method comprises commanding the actuator to a position with a control signal, generating a single-frequency sinusoid signal, injecting the single-frequency sinusoid signal into the control system so that the sinusoid is effectively added to the control signal, multiplying the control signal and the added sinusoid signal by the sinusoid signal to generate a first product signal, measuring a position of the transducer, multiplying the measured transducer position by the sinusoid value to generate a second product signal, low-pass filtering the first product signal to generate a first filtered signal, low-pass filtering the second product signal to generate a second filtered signal, dividing the second filtered signal by the first filtered signal to generate an identification ratio which is proportional to the measured plant gain, then determining a new calibrated plant gain adjustment factor as a function of the identification ratio, and replacing a previous plant gain adjustment factor by said new calibrated plant gain adjustment factor, multiplying the control signal by the new calibrated plant gain adjustment factor to obtain an adjusted control signal, so that the control system automatically compensates for plant bias forces and adapts to changes in effective plant gain.

In another aspect of the invention, the plant phase is measured. In another aspect of the invention, the plant resonance frequency is determined and the effects compensated for.

In another aspect of the invention, a method of linearizing the positioning of a position sensor, such as a transducer head, is provided. The method comprises generating a precision linear position output value over a relatively large range of actuator motion by combining coarse and fine position information.

In another aspect of the present invention, a method for maintaining a position sensor, such as a transducer, in a centered position relative to a desired sensor track is provided. The method comprises the steps of reading position data, calculating a position of the sensor from the position data; calculating a predicted position, velocity, and bias, from previous predicted position, velocity, bias, and control values, and current control value; generating a control value based on the predicted position, velocity, and bias values; limiting the control value to a predetermined maximum value; multiplying said control value by a plant gain adjustment factor to generate a compensated control value; shifting the level of the compensated control value to a predetermined range; generating a compensated control signal in response to the compensated control value; applying the control signal to an amplifier to drive the actuator; calculating an estimator error between the measured position sensor position and the predicted position sensor position; pre-calculating new predicted states for position, velocity, and bias, based on the previous predicted position, velocity, and bias, the estimator error, and the current and previous control values; updating the control value by replacing the previous control value with the present control value; and repeating the method for each actuator servo interrupt.

In other aspects of the present invention, alternate methods for maintaining a position sensor in a desired location are described, one of which is in a form suitable for a transfer function design.

In another aspect, a method for switching among a plurality of amplifier gain modes is described.

In other aspects of the present invention, apparatus is described for implementing the methods described herein.

BRIEF DESCRIPTION OF THE DRAWINGS

The purpose and advantages of the present invention will be apparent to those skilled in the art from the following detailed description in conjunction with the drawings.

FIG. 4 is an illustration which shows the characteristics of the modulo-74 seven-bit Gray code;

Figure 1:
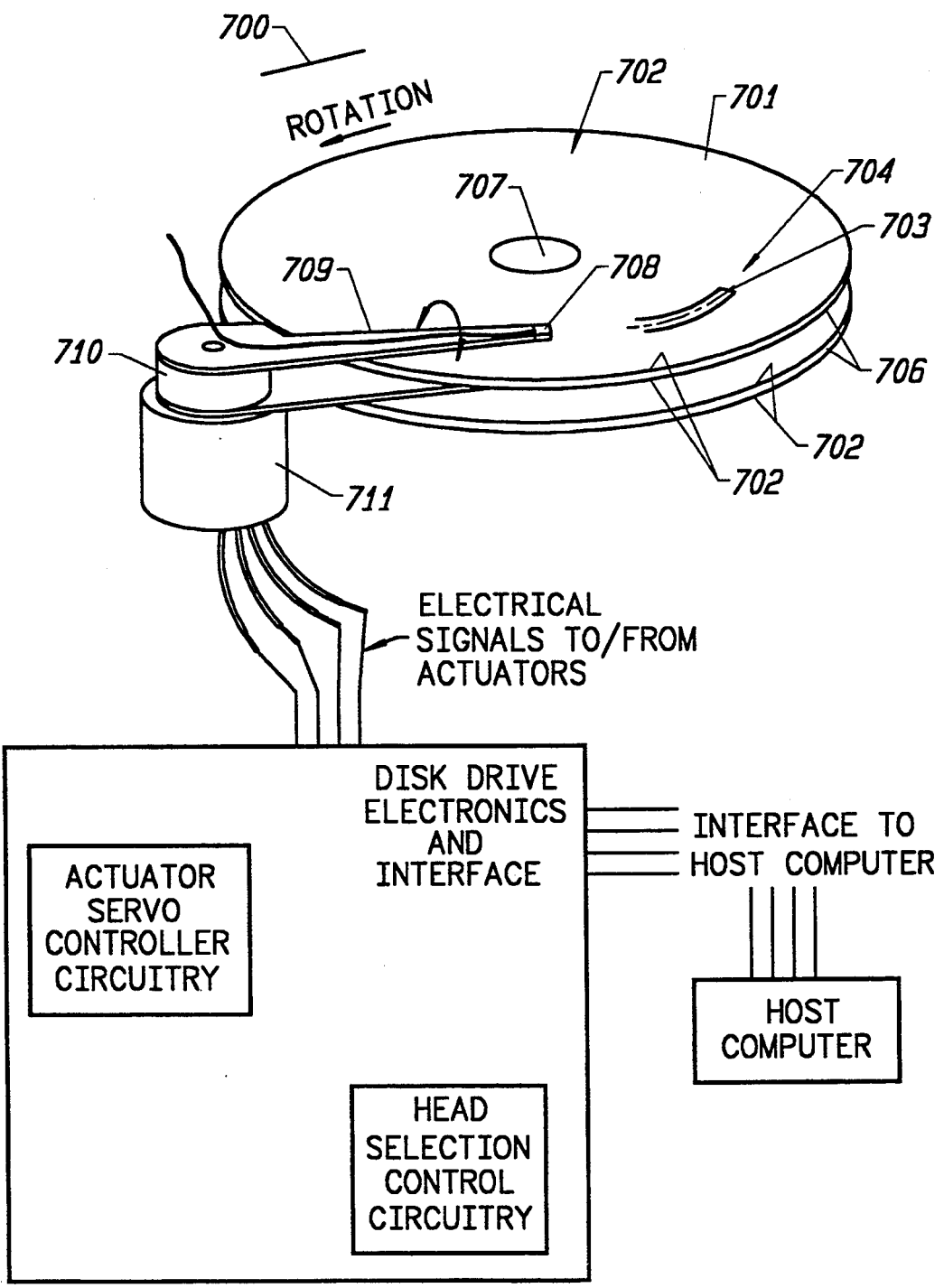
FIG. 1 is an illustration which shows an example of a disc storage device.

The purpose, structure, and advantages of the current invention will be apparent to those skilled in the art from the following detailed description of a particular embodiment of the invention.

DESCRIPTION OF THE PREFERRED EMBODIMENT

The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

This invention is described with respect to a head positioning system of a magnetic disc storage device employing a digital sector servo control scheme and a multi-tasking micro-controller. However, it is applicable to any closed loop system where the plant can be modeled by a linear transfer function with a plant gain constant. The control effort is characterized by a number generated by a digital processor/controller, such as a microprocessor, and that the measurement is read and processed also by the same servo controller. The methods according to the present invention are particularly applicable to digital sampled-data systems, but one skilled in the art will appreciate that these same techniques are analogously applicable to analog systems employing continuous signals, and to hybrid digital-analog systems.

The adaptive sampled data control technique of the present invention greatly reduces noncoherent noise, and both gain and phase information can be derived with the technique. Some of the noncoherent noise is reduced by using signal time averaging techniques. The adaptive algorithm provides optimal performance by maintaining the same gain and phase margins, and crossover frequency, regardless of changes in system parameters. The changes can be due to component tolerances, environmental temperature, humidity, or component aging. In other words, closed-loop performance is maintained even with changes in open-loop gain. Lower cost components with larger variations can be used to build the products. The same performance can then be expected from drive to drive. No adjustment or tuning is required for a product incorporating this adaptive control methodology. This results in lower labor cost and higher reliability than conventional systems.

Because the method for adaptive digital control and the code is independent of the control method used, it is product independent and can be used in many different types of electro-mechanical systems, particularly different disc drive products.

The adaptive control system according to the present invention generates a plant gain constant for each of the servo heads coupled to an electro-mechanical actuator. These gain constants can be read via the interface bus as well as stored away in a data base. This data base can be used to keep track of drive variations, maintain quality control, aid in drive diagnostics, and prevent production problems, The technique can also be used as a tool to measure changes in the actuator's torque constant across the disc, and therefore compensate for these changes if necessary.

The servo system resonance frequency can be determined when a sufficiently high sampling rate is implemented. An adaptive on-line digital notch filter can then be used to cancel out the resonance. The digital notch filter can be synthesized either with a look-up table method or with coefficients being a function of the resonance frequency.

The head positioning servo is a sampled-data control system using a state-space controller with bias estimation. The methods of this invention may also be applied using transfer function equivalents. The system gain is calibrated while the servo is in track following mode. The head positioning system is susceptible to variations in analog to digital (A/D) converter gain, the digital to analog (D/A) converter or pulse-width-modulator (PWM) converter gain, filter gain, power amplifier transconductance gain, torque constant, actuator inertia, head radius, track pitch, sampling period, demodulator gain, and head and media characteristics. During a calibration, a single-frequency sinusoid is added to the control at every sample while track following. The sum of the control and the sinusoid are modulated (multiplied) with the sinusoid. The measured head position is also modulated (multiplied) with the sinusoid. The results of each modulation are applied to separate digital low-pass filters so as to keep only coherent information. The ratio of the filter outputs is then used to compute the plant gain constant.

The measurement consists of two parts: a coarse value based on Gray code reading and a fine value based on the A/D reading. In most disc drive head positioning systems, the linear range of the A/D converter is no greater than $\pm \frac{1}{2}$ a track pitch. Embodiments of the present invention provide a measurement construction technique which combines both the coarse measurement and the fine measurement into a singular number to extend the linear range of the sensor to several tracks.

The present invention describes an adaptive digital control system that has an estimator algorithm to establish the position and velocity of the servo head, and the low-frequency bias of the system. The bias estimate is required to compensate for the bias forces acting upon the system. The amplitude of bias forces need not be constant over the range of actuator motion. The profile of the bias force amplitude versus track position can be arbitrary. The input to the estimator are: the digitized value of the position error signal (PES), the Gray code value, the current digital control value and the last digital control value. At every sample, the controller calculates the control value based on the estimated position, velocity, bias, and the absolute position of the target track. Both the present and last control values are used by the estimator to compensate for computational delay. In order to minimize computational delay, the equations for the estimator and controller are arranged so that only one multiplication and one addition are necessary to calculate the control. The control is then multiplied by a plant gain adjustment factor, $k_g$, to compensate for the difference between the actual plant and the estimator plant model.

The digital control system for the disc drive head actuator operates in two basic modes: seek and track following. In the present invention, the performance of each mode is optimized without impacting the other mode. The velocity profile is stored in random access memory (RAM) and is looked up during the high velocity part of the profile. At the low velocity part of the profile, the velocity is calculated on-line by the microprocessor to improve resolution of the velocity profile. Gain switching of the power amplifier is employed to increase the PWM D/A resolution and track following accuracy. Because of the difference in the design of the two modes, before switching modes it is beneficial to do conversions of state variables as well as compensation for the control. This helps minimize any switching transients when switching from seek mode to track following mode, and results in faster settling time.

In the seek mode, the heads are moved across the tracks. This is achieved by having the estimated velocity follow an optimum velocity trajectory. Once the heads are moved close to the boundary of the desired tracks, the servo operates in track follow mode where the actuator is servo controlled to bring the center of the selected data head to align itself with the centerline of the desired track. To accurately position the heads over the centerline of a track, a closed-loop sampled-data control system is used. The digital control system is a state-space design with a full-order estimator. The estimated states are calculated based on the measurement, the control value, the last control value, and the last estimated states. The bias that the dynamic system is subject to is estimated by the estimator, and the estimated bias is used by the control to cancel out the undesirable bias seen by the plant.

Figure 2:
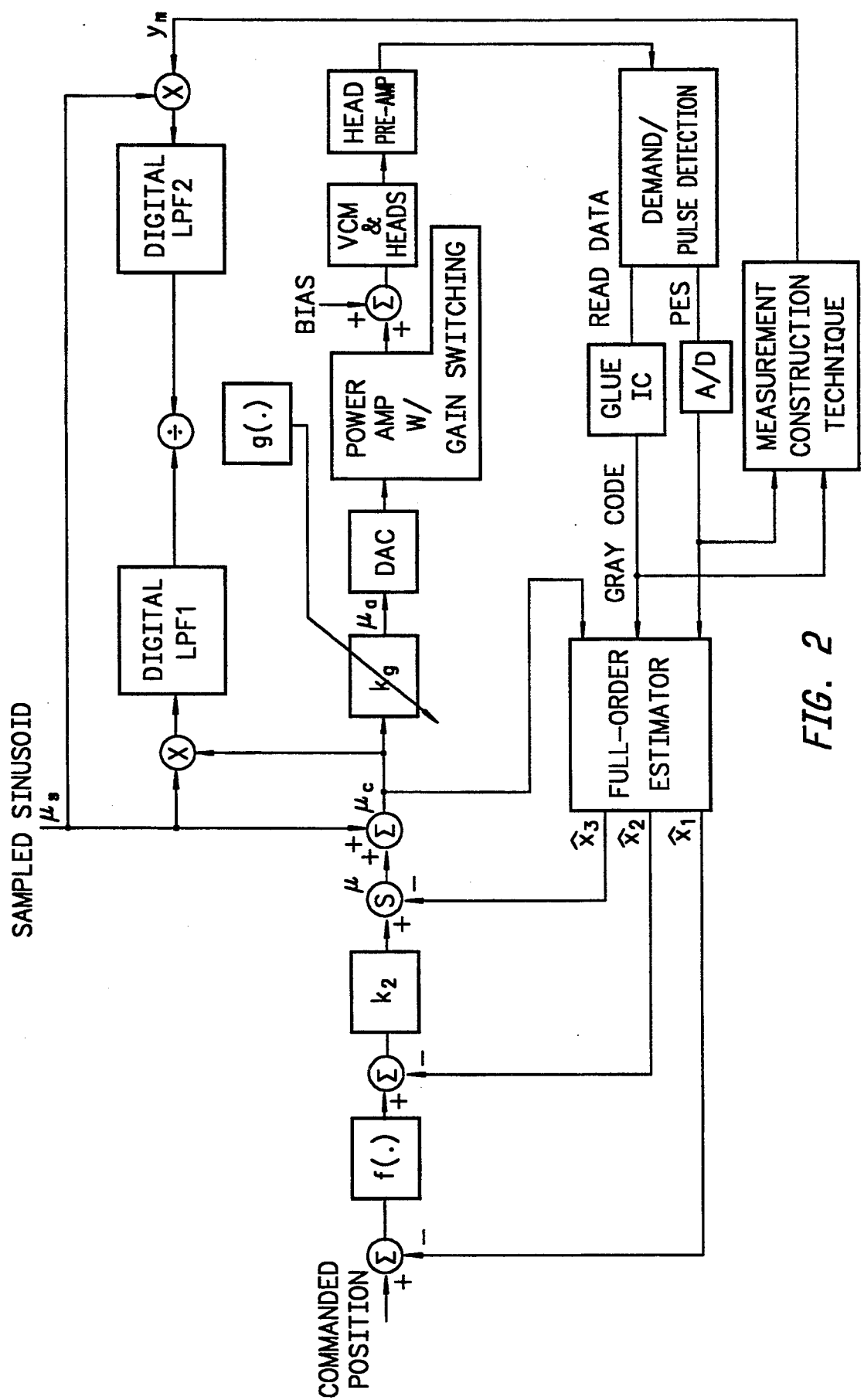
FIG. 2 is an illustration which shows a simplified block diagram of the major components of the present invention.

FIG. 2 is an illustration which shows a simplified block diagram of the major components of the present invention. This figure shows the hardware plant, the various inputs to the plant, and the major elements of the control system. Also illustrated are the parameters of the plant which are controlled by the control system according to this invention. The illustration shows that the method can compensate for bias forces having somewhat arbitrary characteristics, so long as it can be modeled, and is adaptive for changes in plant characteristics and environment. These attributes are not possessed by conventional control systems.

The following section describes the sampled data control system for a magnetic disc drive. Its function is to accurately position the selected read/write-head over the selected track centerline (the track following mode), and to seek to the selected track as fast as possible (the seek mode). The description covers the system hardware, the estimator and control algorithm, the identification algorithm to measure the plant gain constant, and the adaptive on-line gain adjustment to compensate for system parameter variations.

System Hardware

Figure 3:
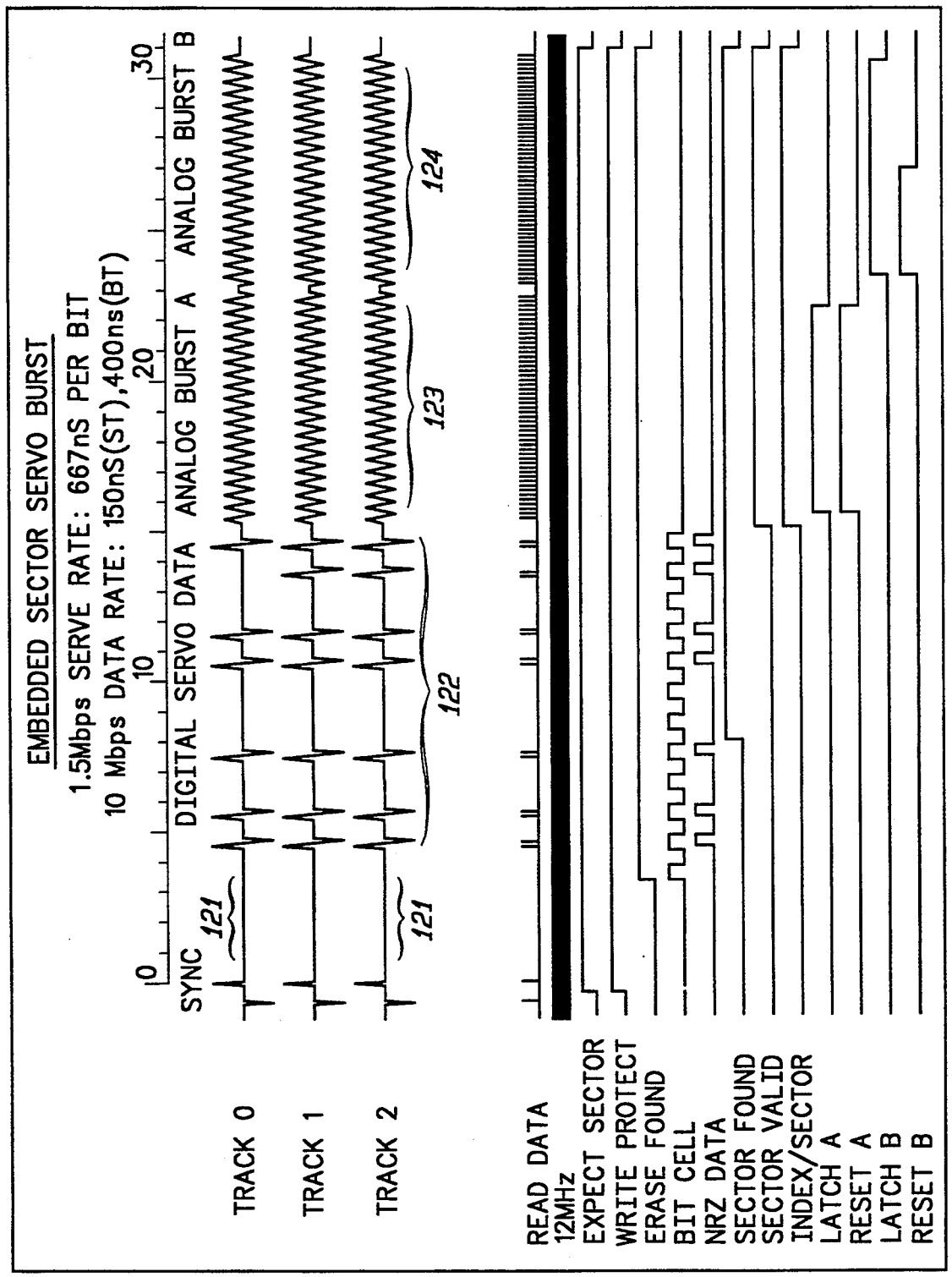
FIG. 3 is an illustration which shows an example of a format of sector servo data and some signals derived from the sector servo data.

FIG. 3 is an illustration which shows a possible format of sector servo data and signals derived from the sector servo data. In this example, a DC erase field 121 is pre-recorded at every sector to signify the beginning of a sector. Coarse track information in the form of modulo-74 seven-bit Gray code 122 and a fine-track information in the form of a first burst signal 123 and a second burst signal 124 is pre-recorded after the DC erase field 121 in this sector servo data format. The fine-track information, the Position Error Signal (PES), is derived from the difference in the detected amplitude of the analog burst signals. The PES is proportional to the distance of the head from its track center.

FIG. 4 is an illustration which shows the characteristics of the modulo-74 seven-bit Gray code. The reason for selecting the modulo-74 code is to limit the maximum number of consecutive zeroes in the Gray code to two, thus preventing erroneous detection of the DC erase field by confusing a sequence of zeros within the Gray code field 122 as the erase field 121.

Figure 5:
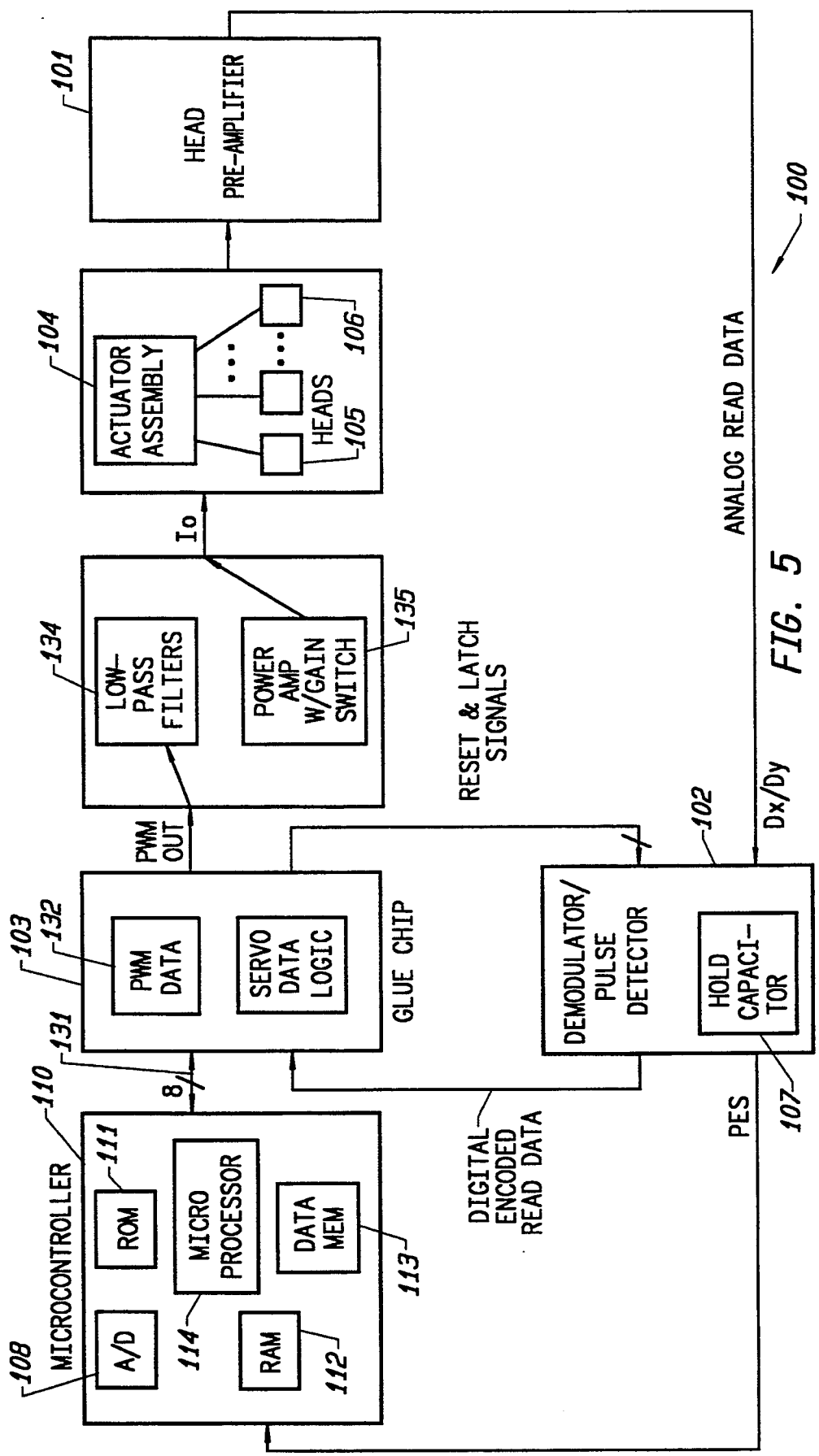
FIG. 5 is an illustration which shows a simplified hardware block diagram of an embodiment of a servo system according to the present invention.

FIG. 5 is an illustration which shows a simplified hardware block diagram of the servo system 100 of the present invention. Although the method of the invention described here is applicable to any digital control system for an electro-mechanical plant; and in particular, may be used on a disc drive having either dedicated servo or embedded sector servo, among others; it will be explained in the context of hardware designed for an embedded sector servo.

Figure 6:
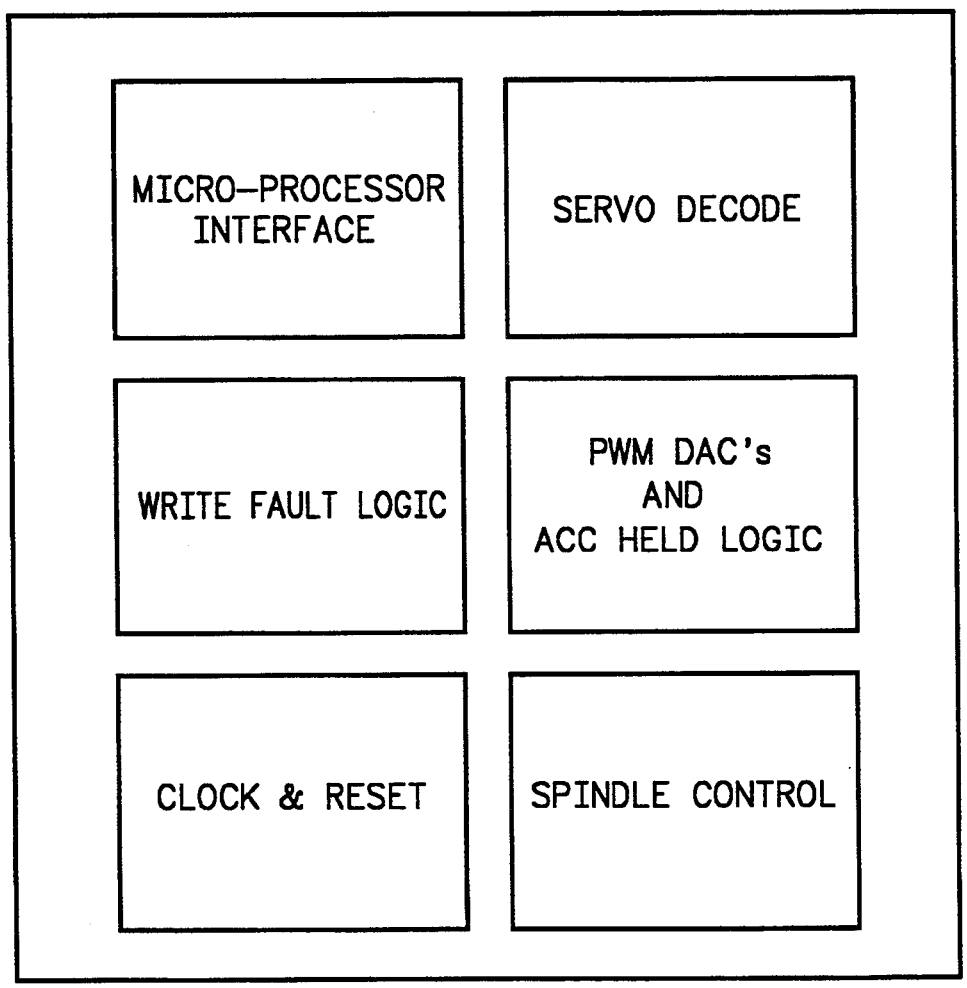
FIG. 6 is an illustration which shows a block diagram for an embodiment of a glue chip.

A single actuator 104 is mechanically coupled to a plurality of heads 105. As the actuator 104 moves the heads 105 across the disc, the analog read back signal of the selected head 106 is amplified by the head pre-amplifier 101 and converted to digital encoded read data by the demodulator/pulse detector 102. One function of the glue chip 103 is to detect the DC erase field from the digital encoded read data. Once the DC erase field 121 is located on the disc surface, the glue chip 103 generates reset and latch signals to sequentially discharge and then charge hold capacitors 107 in the demodulator to a voltage corresponding to the average amplitude of the burst signals 123, 124. The Position Error Signal (PES) is a signal which is proportional to the difference between the average amplitude of the first and second burst signals 123, 124. Thus, the PES is also proportional to the distance from the centerline of the nearest track. The PES signal is converted to a digital number by the A/D converter 108. The glue chip 103 also generates servo interrupt signals for the microprocessor, sector mark data which contains guard band and index information, and grey code information. FIG. 6 is an illustration which shows a block diagram for an embodiment of a glue chip 103. This glue chip provides several functions in a single package and comprises the following device control functions: Power-on Reset Circuit, Chip Select Logic, Write Fault Logic, Spindle Speed Control, Two Pulse Width Modulated D/A Outputs, and Embedded Servo Decode. In addition to the illustration of the sector servo code format, FIG. 3 is an illustration which shows the read data signal and several of the signals present in the glue chip 103.

In reference to FIG. 5, there is shown a multi-tasked time-shared micro-controller 110 with read-only memory (ROM) 111, random access memory (RAM) 112, data memory 113, and a microprocessor 114. The micro-controller 110 provides overall coordination and processing control. The algorithms described subsequently are performed digitally by the microprocessor 114. In practice various embodiments of the invention may utilize a different possible micro-controller or microprocessor whose computational speed should be commensurate with the servo sampling rate. For one embodiment of the present invention, an Intel 8XC198 16-MHz multi-tasked time-shared micro-controller 110 is used, for example. This particular micro-controller incorporates a microprocessor 114, A/D converter 108, and ROM 111 into a single package. The RAM 112 is external to the package. Separate microprocessors 114, ROM 111, and A/D converter 108 may also be used.

In one embodiment of the present invention, the algorithmic code for the digital control is divided in two parts. One part resides in the internal ROM 111 and the other in RAM 112 external to the micro-controller 110. ROM code consists of only those parts of the servo code which are unlikely to change. RAM code can be changed quite easily, and the parts of the servo code which are likely to be changed are downloaded to RAM 112 via an interface to a host computer (not shown) to the reserved tracks of the disc drive during manufacture. Every time the drive is powered up, the binary code in the reserved tracks is uploaded into external RAM 112 of the micro-controller 110.

In the embodiment of the present invention using the Intel 8XC198 micro-controller, the A/D converter 108 is built into the micro-controller 110. The micro-controller 110 communicates with a glue chip 103 via a multiplexed address/data bus 131. The micro-controller 110 reads the Gray code from the glue chip 103 and the digitized PES from the A/D converter 108. The microprocessor 110 also performs the estimator algorithm computations, computes the control value, and then sends the control value to a pulse-width modulator (PWM) circuit 132, a form of D/A converter, in the glue chip 103. The output of the PWM 132 is filtered by a second-order low-pass filter 134 to remove the switching noise. Filters having other characteristics, including higher order filters, may also be used. The filter output is then amplified by a transconductance power amplifier 135 to provide current drive to the actuator assembly 104.

Adaptive On-Line Calibration and Control

The overall method for calibrating and adaptively controlling an electromagnetic system such as a disc drive head actuator servo comprises several separable methods which work in concert.

In simplified terms, the precision head positioning procedure 403 provides a precise measurement, $y_m$, of the location of the read/write head 708 which is mechanically connected to the actuator 710. This measured position is derived from the Gray code and the digitized value of the analog PES signal which are read every time a valid d.c. erase field is detected by the glue chip 103.

The track following mode procedure 402 provides a compensated control, $u_c$, based on the current head position, $y_m$, a present plant gain adjustment factor, $k_g$, and predicted states for head position, velocity, and actuator bias.

The adaptive gain adjustment procedure 403 calculates an updated plant gain adjustment factor, $k_g$, for the particular track or zone of tracks based on the measured position, $y_m$, the adjusted control, $u_a$, and a single frequency sampled sinusoidal signal, $u_s$. The digitally generated sinusoid, $u_s$, is used in a procedure to accomplish extraction of desired signals and suppression of undesired signals. Only sampled values of continuous signals are used in this digital control method. Analogous continuous signals may be used applying the methods of this invention for an analog or hybrid digital-analog system. Once calculated, the plant gain adjustment factor, $k_g$, is then used subsequently as part of the control algorithm. In general, a different plant gain adjustment factor, $k_g$, may be calculated for each head and for each track or zone of tracks on the disc. The physical extent of a particular zone generally depending upon the desired accuracy and precision, and the characteristics of the dynamic system. The gain adjustment procedure may be performed for each head, and each zone of the disc. Each of the constituent procedures, 401, 402, 403, is described in greater detail below. Aspects of the procedures may be applied to conventional systems with some improvement in performance. For example, the adaptive on-line gain calibration 401 procedure may be implemented without incorporating the Precision Head Position Measurement 403 technique. However, the best way to practice the invention and wherein the greatest improvement in performance will be obtained is to use all of these procedures 401, 402, 403 in concert.

Precision Head Position Measurement Procedure (PHPMP)

The adaptive on-line plant gain calibration is accomplished by first commanding the head/actuator to the center of a zone of tracks to be calibrated. A zone of tracks may be a single track or it may be a region of the disc including a plurality of tracks. The command to the desired track center is accomplished by performing a seek. For the initial calibration, the value of the compensating gain constant, $k_g$, is assumed to be unity ($k_g=1$). When the seek to the target zone is accomplished, the system is commanded to perform a track following mode. In track following mode, the servo data is read, including the Gray code 122 and the digitized value of the PES derived from the two analog signal bursts 123, 124. The servo data is then used with a measurement construction technique to calculate a value of the head position, $y_m$. The measurement technique according to the present invention provides a method of linearizing the position measurement across several servo tracks and in most cases across the entire seek length of the actuator. In a conventional disc drive control system, the linear range of the position sensor, including the A/D, may be limited to only about $\pm\frac{1}{2}$ of the track separation or pitch. Track pitch is the radial separation distance between adjacent tracks.

Figure 7:
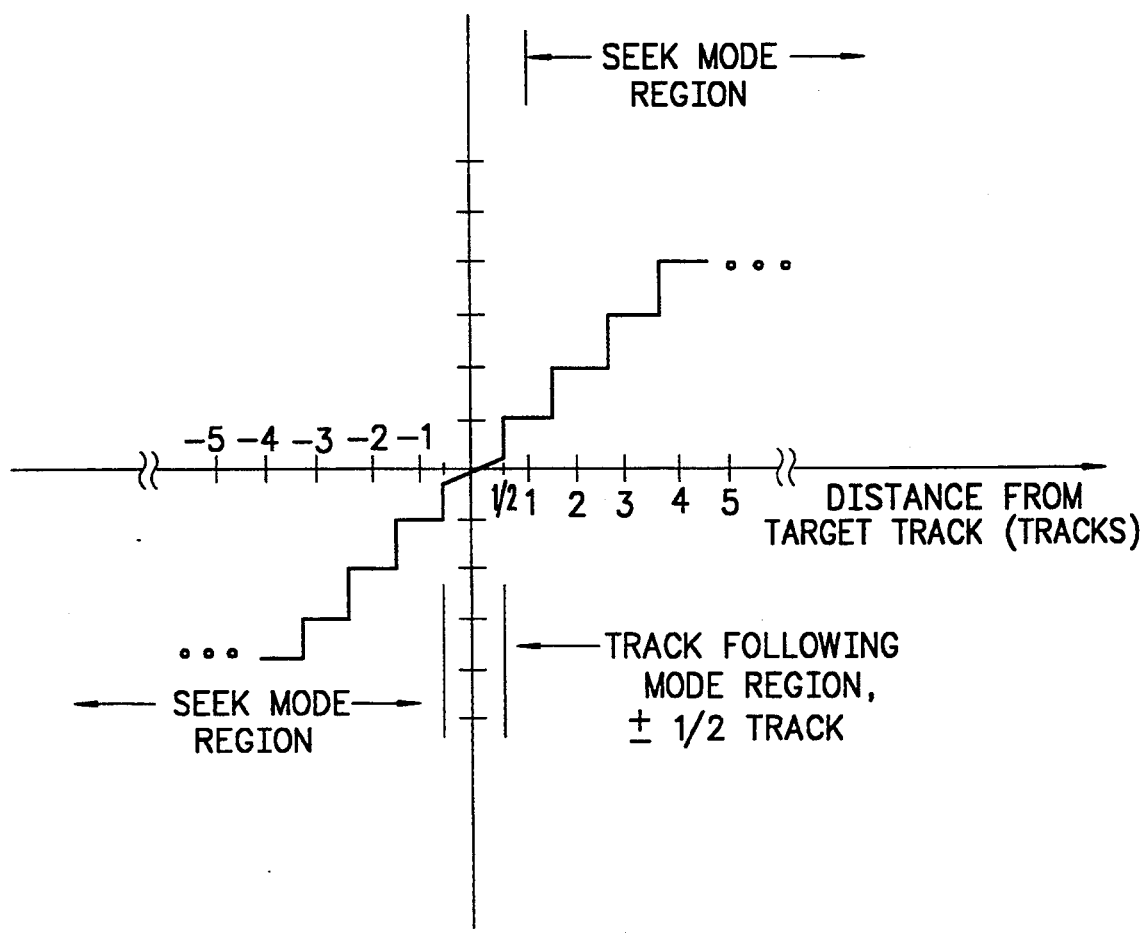
FIG. 7 is an illustration which shows a diagram of the method of deriving transducer head position information from coarse and fine position information in different modes.

FIG. 7 is an illustration which shows a flowchart of the conventional method of deriving transducer head position information from coarse and fine position information. In this conventional method, coarse track information, such as from the grey code, is used for seeking, and fine track position information (PES) is used for track following mode.

Figure 8:
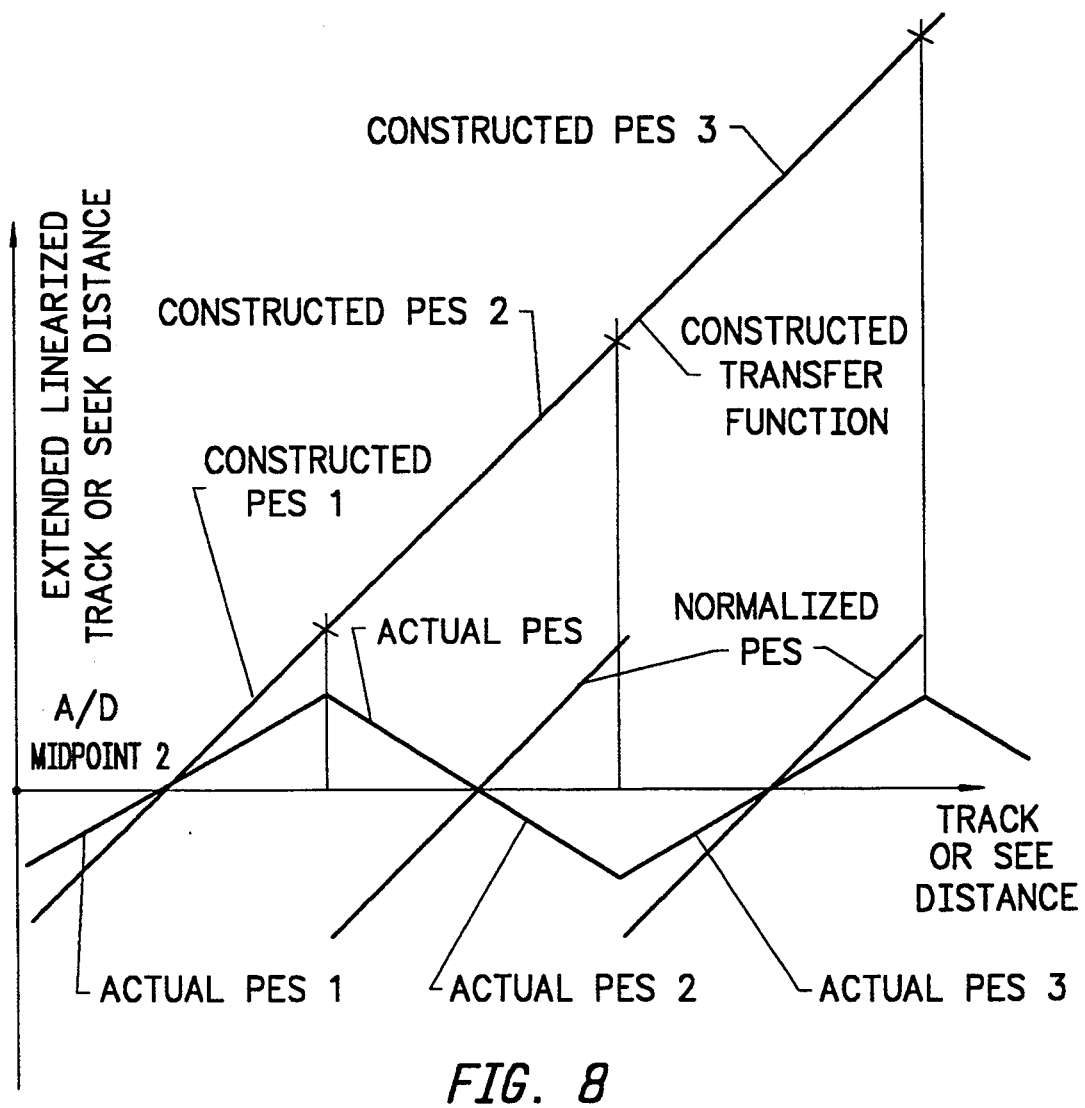
FIG. 8 is an illustration which shows a measurement construction technique which provides a methodology for combining a coarse measurement value and a fine measurement value into a singular number so that the linear range of a position sensor is extended to many disc servo tracks.

FIG. 8 illustrates a measurement construction technique according to the present invention which provides a methodology for combining both the coarse measurement value and the fine measurement value into a singular number so that the linear range of the position sensor is extended to many tracks. In FIG. 8 there is shown a graph of measured position, $y_m$, versus disc track, or equivalently seek distance, showing a method of constructing a continuous linear transfer function across the entire seek length of the head by combining the piece-wise linear transfer functions across individual tracks and the continuous transfer function of the PES versus displacement characteristic. The measurement technique which is presented graphically in FIG. 8 may be understood in the context of the description and mathematical relation below.

The method for combining the coarse and fine measurements and extending the linear range of the position sensor is described in the context of an embodiment of the invention using a 16-bit value for the position measurement, $y_m$, and an 8-bit A/D converter. However, it is applicable to any bit length words.

Figure 9:
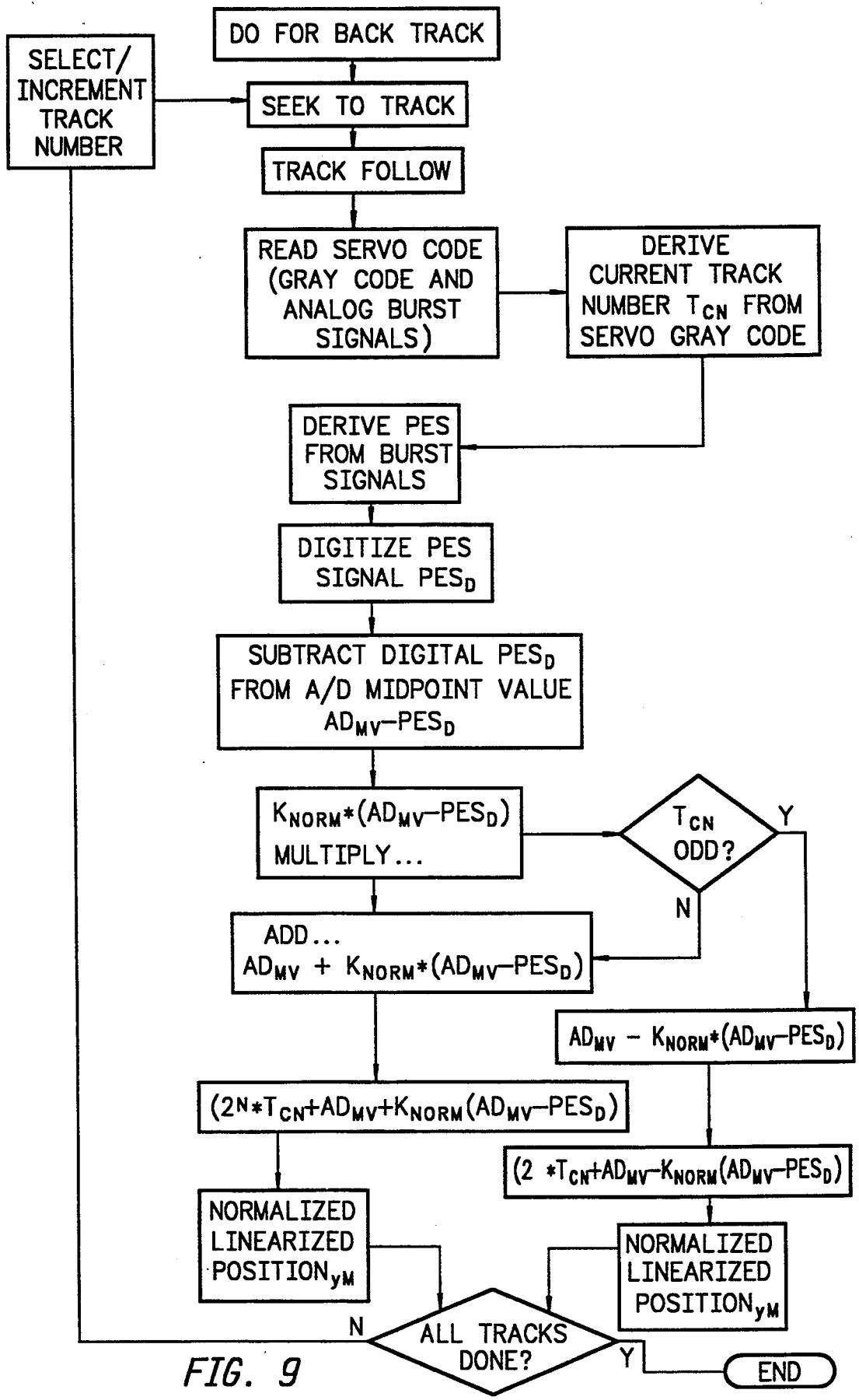
FIG. 9 is an illustration which shows a flowchart of an embodiment of the methodology for constructing the linear transfer function over a relatively long seek length, and determining a precise value of head position.

FIG. 9 is an illustration which shows a flowchart of an embodiment of the computational methodology for constructing the linear transfer function over a relatively long seek length, and determining a precise value of head position, $y_m$. The extension of the linear transfer function over the entire seek length of the actuator, rather than a piece-wise transfer function as in the conventional control system, is advantageous because it improves: 1) the smoothness of the seek current, and 2) quantization noise and transition from seek to track follow mode. It also increases the capture range from $\pm\frac{1}{2}$ track to plus-or-minus several tracks. The method according to the present invention comprises the following steps:

PHPMP Step 1. The head preamplifier 101 reads the servo code, including the Gray code pulses 122 and the analog burst signals 123, 124, and supplies analog read data to the demodulator/pulse detector 107. The demodulator/pulse detector 107 provides an analog PES signal to the A/D converter 108 and digital read data to the glue chip 103 and servo data logic.

PHPMP Step 2. Subtract the digitized PES value from the null value (mid-point) of the A/D converter 108. For an 8-bit A/D converter, the theoretical mid-point value is 128. An actual value of the mid-point may differ from the theoretical value and can be calibrated and used instead of the theoretical value.

PHPMP Step 3. Multiply the difference between the digitized PES value and the theoretical A/D mid-point by a normalizing constant, $k_{norm}$, to bring the multiplication result to one-half of the full-scale value of the A/D converter. For an 8-bit A/D, the multiplication result should range from $-128$ to $+127$ counts.

PHPMP Step 4. Negate the result if the current track number, $T_{cn}$, based on the Gray code value, is odd in order to convert the slope of the transfer function to be the same as that of an even track.

PHPMP Step 5. Add the multiplication result to the mid-point value of the A/D. For the 8-bit A/D, the result should be in the range of 0 to 255.

PHPMP Step 6. Shift the current track number derived from the Gray code 122 by the A/D word length. This bit shift is equivalent to multiplying the current track by $2^n$ where n is the A/D word length. For an 8-bit A/D converter word length, the multiplication factor is 256.

PHPMP Step 7. Add the result of the addition (PHPMP Step 5) and the track number shift (PHPMP Step 6) together to obtain the position measurement, $y_m$.

The PHPMP procedure can be expressed mathematically by the pair of expressions:

$$y_m = (2^n \times t_{cn}) + (k_{norm} \times (AD_{mv} - PES)) + AD_{mv},$$

for $T_{cn}$ even; and $$y_m = (2^n \times T_{cn}) - (k_{norm} \times (AD_{mv} - PES)) + AD_{mv},$$

for $T_{cn}$ odd.

In these equations, n is the A/D word bit length, $k_{norm}$ is the multiplicative normalizing constant that may be specific to each track or zone of tracks, PES is the digitized PES value, $T_{cn}$ is the current track number which value is extracted from the servo Gray code 122, and $AD_{mv}$ is the mid-point value of the digital output of the A/D converter.

Adaptive Control Procedure (ACP)

Figure 10:
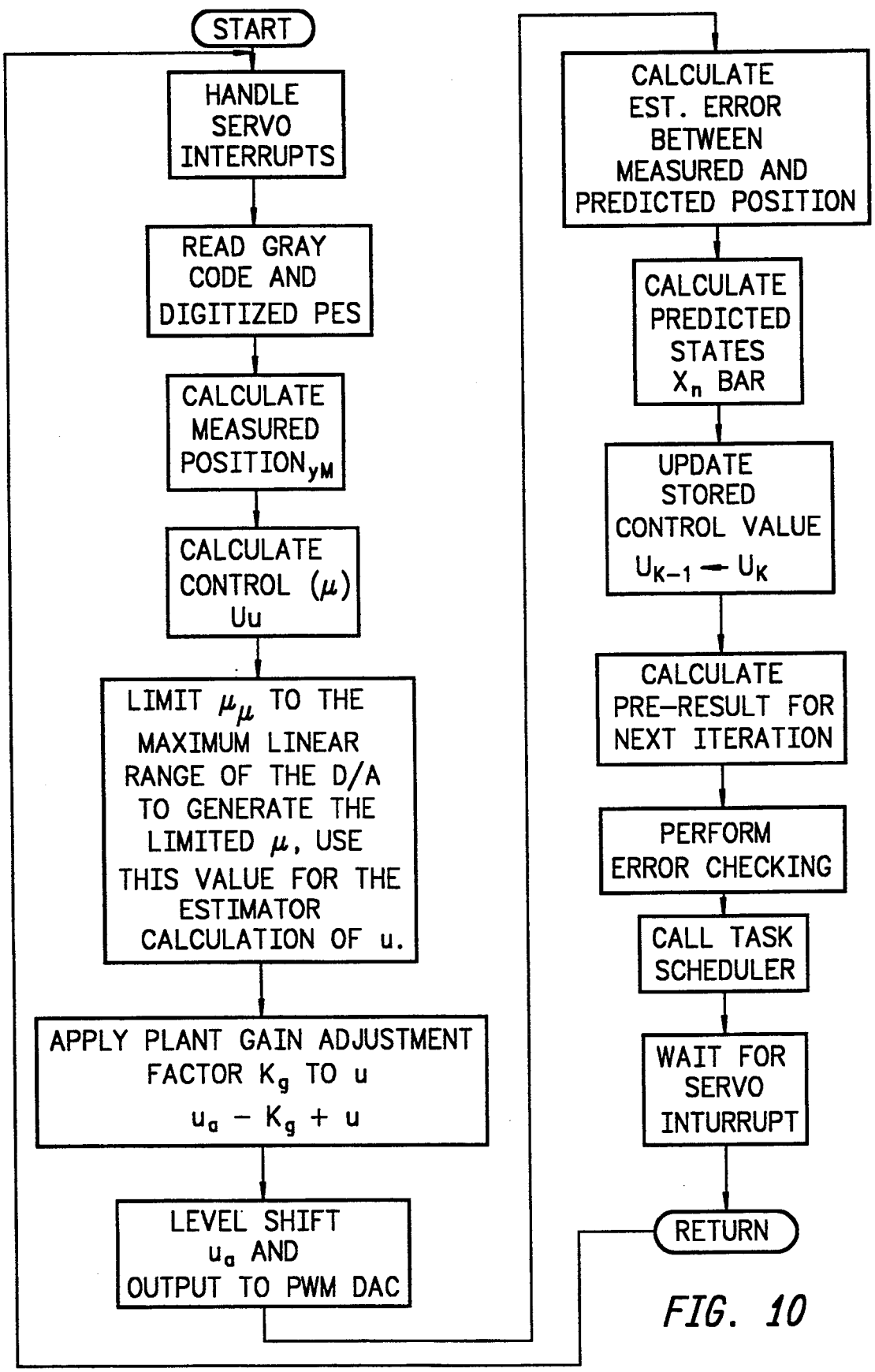
FIG. 10 is an illustration which shows a flowchart of an embodiment of the Adaptive Control Procedure.

FIG. 10 is an illustration which shows a flowchart of an embodiment of the adaptive control procedure. Each of the steps represented in FIG. 10 is described in greater detail below. Some of these steps described herein for the ACP overlap or are included in the descriptions of the other methods. This descriptive overlap is largely unavoidable since the other procedures may represent refinements or extensions of other techniques described.

ACP Step 1. Handle Servo interrupt.

ACP Step 2. Read the Gray code and the digitized PES.

ACP Step 3. Calculate the actual position measurement, $Y_m$. (This Precision Head Position Measurement Procedure has been previously described.) The value $y_m$ is a 32-bit number with its least significant byte calcuated from the A/D.

ACP Step 4. Calculate the control, $u_u$, based on pre-calculated predicted states for position, velocity, and bias; and current position measurement $y_m$.

The equation for the control, $u_u$, is given by:

$$u_u = a_1 \times y_m + pre\_result,$$

where $$a_1 = -KL$$

and $$pre\_result = (K \times L \times C_e - K) \times \bar{x} + K(1) \times r$$

where K=control gain, and L=estimator gain, $C_e$ is the output vector that translates the estimated state to the measurement, and where pre_result is a result of the pre-calculation based on predicted states. The measurement is in general a linear combination of the estimated state. Pre-result in either initialized to a value or is available from the prior execution of this procedure under ACP step 11. To reduce computational delay and phase loss, the design equations are arranged to pre-calculate for the next sample so that only one multiplication and one addition are required to output to the PWM 135.

ACP Step 5. Limit the control, $u_u$, to maximum linear range of the PWM D/A convertor to generate the limited control, u. Preferably, $u_u$ should be limited such that the product $k_g \times u_u$ does not exceed the maximum linear range of the PWM D/A converter, ACP Step 6. Adjust the limited control, u, by the plant gain adjustment factor, $k_g$, to compensate for variation in plant characteristics.

The adjusted control, $u_a$, is given by the expression:

$$u_a = k_g \times u$$

where $k_g$ is used to compensate for the fact that the estimator model has a different gain constant than the actual system.

ACP Step 7. Level shift the adjusted control, $u_a$, and output it to the PWM for application to the actuator.

ACP Step 8. Calculate the estimator error between the measured and predicted head position.

The estimator error, e, is given by the expression:

$$\begin{aligned} e &= y_m - C_e \times \bar{x} \\ &= y_m - \bar{x}_1 \end{aligned}$$

where $\bar{x}_1$=predicted position, $\bar{x}_2$=predicted velocity, $\bar{x}_3$=predicted bias. The predicted position, $\bar{x}_1$, is a double word including n bits with a resolution of $\frac{1}{2}^n$ of a track.

ACP Step 9. Calculate the new predicted states in anticipation of the next iteration of the compensation procedure.

The predicted states for position, $\bar{x}_1$; velocity, $\bar{x}_2$; and bias, $\bar{x}_3$, are given by the following expressions:

$$\bar{x}_1 \leftarrow \bar{x}_1 + b_1 \times \bar{x}_2 + b_2 \times \bar{x}_3 + b_3 \times u + b_4 \times u_{k-1} + b_5 \times e$$

$$\bar{x}_2 \leftarrow \bar{x}_2 + b_6 \times \bar{x}_3 + b_7 \times u + b_8 \times u_{k-1} + b_9 \times e$$

$$\bar{x}_3 \leftarrow \bar{x}_3 + b_{10} \times e$$

where
$\bar{x}_1$=predicted position,
$\bar{x}_2$=predicted velocity,
$\bar{x}_3$=predicted bias,
e is the estimator error defined above,
u is the present control which has been limited,
$u_{k-1}$ is the previous control,
$b_1 = A_e(1,2)$,
$b_2 = A_e(1,3)$,
$b_3 = B_{e1}(1)$,
$b_4 = B_{e2}(1)$,
$b_5 = L(1) + A_e(1,2) \times L(2) + A_e(1,3) \times L(3)$,
$b_6 = A_e(2,3)$,
$b_7 = B_{e1}(1)$,
$b_8 = B_{e2}(2)$,
$b_9 = L(2) + A_e(2,3) \times L(3)$, and
$b_{10} = L(3)$.

ACP Step 10. Update the control value, u, by replacing the previous control value, $u_{k-1}$, with the present control value in anticipation of the next control iteration:

$$u_{k-1} \leftarrow u.$$

ACP Step 11. Calculate the pre-result for the next sample.

The pre_result for next sample is given by the expression:

$$pre\_result = a_{21} \times \bar{x}_1 + a_{22} \times \bar{x}_2 + a_{23} \times \bar{x}_3 + a_3 \times r$$

where
$A_2 = [a_{21}\ a_{22}\ a_{23}] = (K \times L \times C_e) - K$
$a_3 = K(1)$.

ACP Step 12. Optionally perform error checking.

ACP Step 13. Optionally call the task scheduler.

ACP Step 14. Return to ACP Step 1 on receipt of the next servo interrupt.

Another embodiment or variation of the practical implementation of the method is described below. This implementation differs from that described above in that the error estimator is computed earlier and the calculation of the control :incorporates the error estimator rather than the measured position directly. The pre-calculated pre_result also differs between the two approaches and constants may differ.

First Alternate Adaptive Control Procedure (FAACP)

Figure 11:
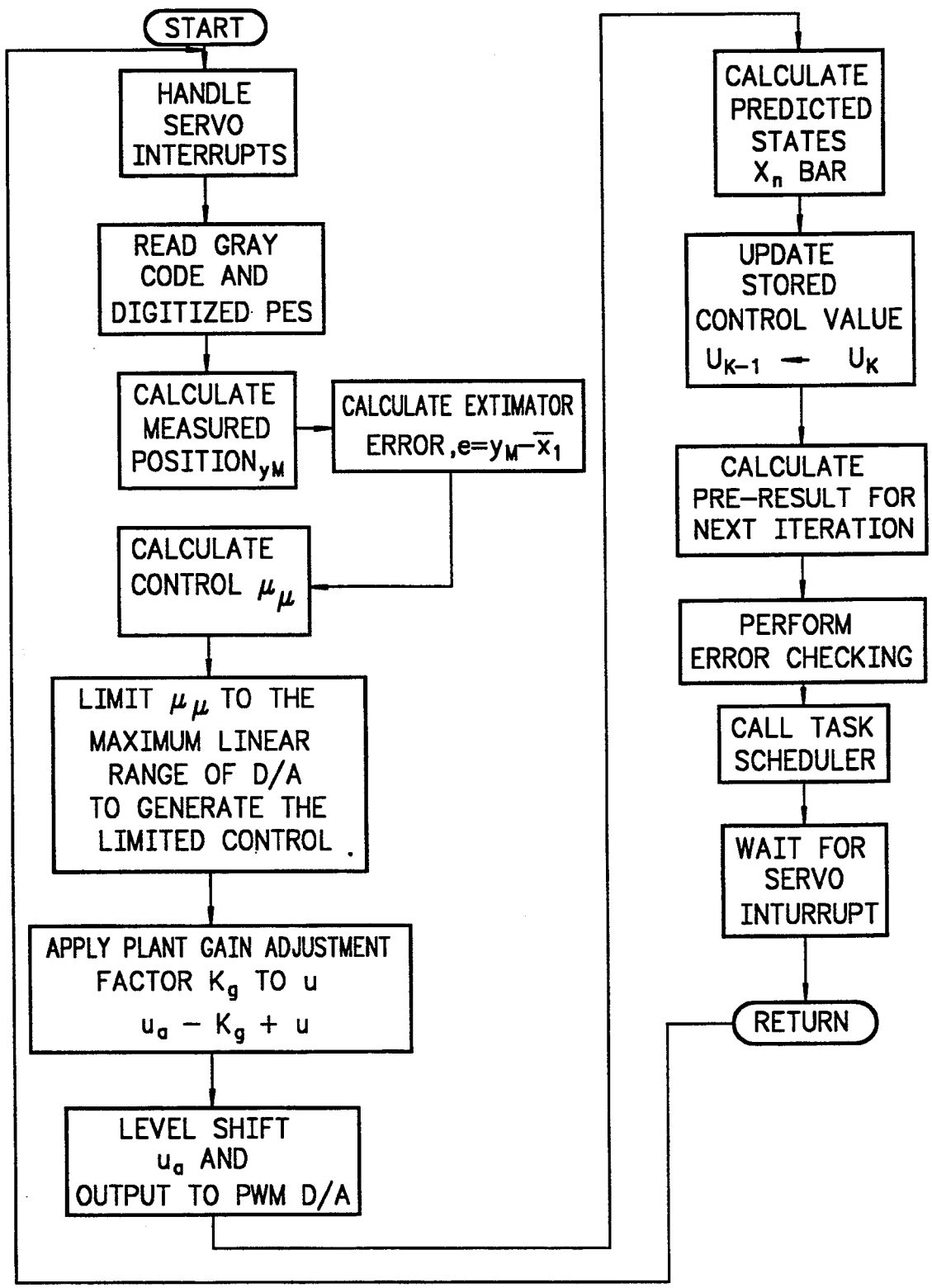
FIG. 11 is an illustration which shows a flowchart of a First Alternate embodiment of the Adaptive Control Procedure.

FIG. 11 is an illustration which shows a flowchart of a first alternate embodiment of the track following mode procedure. This alternate method differs in that the mathematics to be implemented are somewhat simpler. Generally, the ACP method according to FIG. 10 is preferred because the control u can be calculated with less computation delay since the estimator error does not have to be calculated first. Each of the steps represented in FIG. 11 is described in greater detail below. Some of these steps described herein for the FAACP overlap or are included in the descriptions of the other methods. This descriptive overlap is largely unavoidable since the other procedures may represent refinements or extensions of other techniques described.

FAACP Step 1. Handle Servo interrupt.

FAACP Step 2. Read the Gray code and the digitized PES.

FAACP Step 3. Calculate the actual position measurement, $y_m$. (This Precision Head Position Measurement Procedure has been previously described.) The value $y_m$ is a 32-bit number with its least significant byte calculated from the A/D.

FAACP Step 4. Calculate the estimator error, e, based on the equation:

$$e = y_m - C_e \times \bar{x}$$
$$= y_m - \bar{x}_1$$

where $\bar{x}_1$ = predicted position, $\bar{x}_2$ = predicted velocity, $\bar{x}_3$ = predicted bias. The predicted position, $\bar{x}_1$, is a double word including n bits with a resolution of $\frac{1}{2}^n$ of a track.

FAACP Step 5. Calculate the control, $u_u$, based on pre-calculated predicted states for position, velocity, and bias.

The equation for the control, $u_u$, is given by:

$$u_u = a_1 \times e + pre\_resultA,$$

where $a_1 = -K \times L$, and pre_resultA is a result of the pre-calculation based on predicted states given by the expression:

$$pre\_resultA = -K(1) \times (\bar{x}_1 - r) - K(2) \times x_2 - (1/k_{s3}) \times x_3$$

where $k_{s3}$ = a scale factor for the bias estimate.

FAACP Step 6. Limit the control, $u_u$, to the maximum linear range of the PWM D/A convertor to generate the limited control u. Preferably, $u_u$ should be limited such that the product $k_g \times u_u$ does not exceed the maximum linear range of the PWM D/A converter.

FAACP Step 7. Adjust the control by the plant gain adjustment factor, $k_g$, to compensate for variation in plant characteristics.

The adjusted control, $u_a$, is given by the expression:

$$u_a = k_g \times u$$

where $k_g$ is used to compensate for the fact that the estimator model has a different gain constant than the actual system.

FAACP Step 8. Level shift the adjusted control, $u_a$, and output it to the PWM for application to the actuator.

FAACP Step 9. Calculate the predicted states in anticipation of the next iteration of the compensation procedure.

The predicted states for position, $\bar{x}_1$; velocity, $\bar{x}_2$; and bias, $\bar{x}_3$, are given by the following expressions:

$$\bar{x}_1 \leftarrow \bar{x}_1 + b_1 \times \bar{x}_2 + b_2 \times \bar{x}_3 + b_3 \times u + b_4 \times u_{k-1} + b_5 \times e$$

$$\bar{x}_2 \leftarrow \bar{x}_2 + b_6 \times \bar{x}_3 + b_7 \times u + b_8 \times u_{k-1} + b_9 \times e$$

$$x_3 \leftarrow \bar{x}_3 + b_{10} \times e$$

where
$\bar{x}_1$ = predicted position,
$\bar{x}_2$ = predicted velocity,
$\bar{x}_3$ = predicted bias,
e is the estimator error defined above,
u is the present control which has been limited,
$u_{k-1}$ is the previous control,
$b_1 = A_e(1,2)$,
$b_2 = A_e(1,3)$,
$b_3 = B_{e1}(1)$,
$b_4 = B_{e2}(1)$,
$b_5 = L(1) + A_e(1,2) \times L(2) + A_e(1,3) \times L(3)$,
$b_6 = A_e(2,3)$,
$b_7 = B_{e1}(1)$,
$b_8 = B_{e2}(2)$,
$b_9 = L(2) + A_e(2,3) \times L(3)$, and
$b_{10} = L(3)$.

FAACP Step 10. Update the control value, u, by replacing the previous control value, $u_{k-1}$, with the present control value in anticipation of the next control iteration:

$$u_{k-1} \leftarrow u.$$

FAACP Step 11. Calculate the pre-result for the next sample.

The pre_result for next sample is given by the expression:

$$pre\_resultA = K(1) \times \bar{x}_1 - K(2) \times \bar{x}_2 - (1/k_{s3}) \times \bar{x}_3 + K(1) \times r.$$

FAACP Step 12. Optionally perform error checking.
FAACP Step 13. Optionally call the task scheduler.
FAACP Step 14. Return to FAACP Step 1 on receipt of the next servo interrupt.

Second Alternate Adaptive Control Procedure (SAACP)

Figure 12:
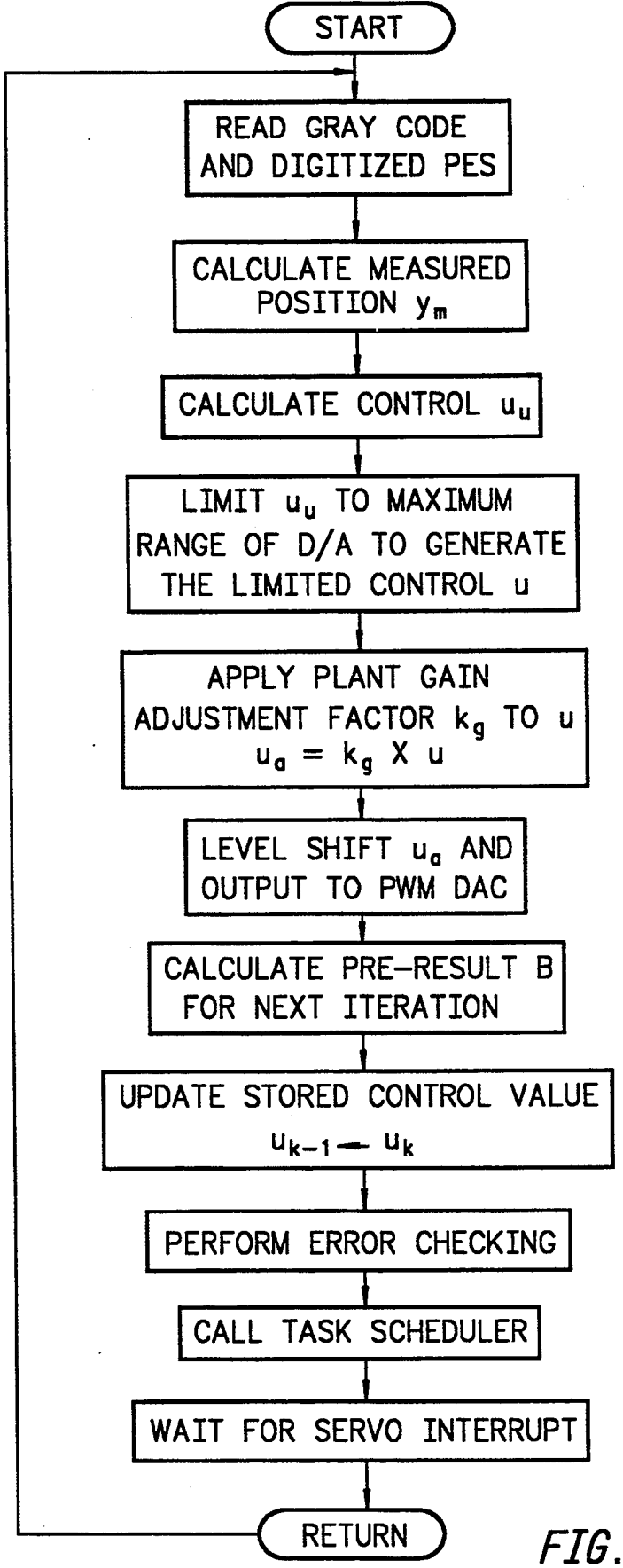
FIG. 12 is an illustration which shows a flowchart of a Second Alternate embodiment of the Adaptive Control Procedure.

FIG. 12 is an illustration which shows a flowchart of a second embodiment of the adaptive control procedure. Each of the exemplary steps represented in FIG. 12 is described in greater detail below. This adaptive control procedure will work without using an estimator. It will work using a transfer function design. The general form of the transfer function of a compensator may be given by, for example, the expression:

$$D(z) = [c_0 z^n + c_1 z^{n-1} + \ldots + c_n]/[z^n + d_1 z^{n-1} + \ldots + d_n].$$

SAACP Step 1. Handle Servo interrupt.

SAACP Step 2. Read the Gray code and the digitized PES.

SAACP Step 3. Calculate the actual position measurement, $y_m$. (This Precision Head Position Measurement Procedure has been previously described.) The value $y_m$ is a 32-bit number with its least significant byte calculated from the A/D.

SAACP Step 4. Calculate the control, $u_u$, based on $y_m$ and precalculated value of the control, pre_resultB.

The equation for the control, $u_u$, is given by:

$$u_u = c_0 \times y_m + pre\_resultB,$$

where pre_resultB is a result of the pre-calculation based on the history of u and $y_m$. Pre_resultB is either initialized or is available from the previous execution of this procedure. To reduce computational delay and phase loss, the design equations are arranged to pre-calculate for the next sample so that only one multiplication and one addition are required to output to the PWM 135.

SAACP Step 5. Limit the control, $u_u$, to maximum linear range of the PWM D/A convertor to generate the limited control, u. Preferably, $u_u$ should be limited such that the product $k_g \times u_u$ does not exceed the maximum linear range of the PWM D/A converter.

SAACP Step 6. Adjust the limited control, u, by the plant gain adjustment factor, $k_g$, to compensate for variation in plant characteristics.

The adjusted control, $u_a$, is given by the expression:

$$u_a = k_g \times u$$

where $k_g$ is used to compensate for the fact that the theoretical model has a different plant gain constant than the actual system.

SAACP Step 7. Level shift the compensated gain, $u_a$, and output it to the PWM for application to the actuator.

SAACP Step 8. Calculate the pre-resultB for the next sample.

The pre_resultB for next sample is given by the expression:

$$pre\_resultB = c_1 y_m(k) + c_2 y_m(k-1) + \ldots + c_n y_m(k-n+1) - d_1 u(k) - d_2 u(k-1) - \ldots - d_n u(k-n+1)$$

where the pre_resultB is a function of the history of u and $y_m$, and n is the order of the transfer function.

SAACP Step 9. Update the control value, u, by replacing the previous control value, $u_{k-1}$, with the present control value in anticipation of the next control iteration:

$$u_{k-1} \leftarrow u$$

SAACP Step 10. Optionally perform error checking.
SAACP Step 11. Optionally call the task scheduler.
SAACP Step 12. Return to SAACP Step I on receipt of the next servo interrupt.

Seek Mode Control

The control for seek mode may also be pre-calculated based on the expression for control, u:

$$u = a_{1sk} \times v_c + a_{2sk} \times e + a_{3sk} \times \hat{x}_2 + a_{4sk} \times \hat{x}_3$$

where $v_c$ is the velocity command. A value for $v_c$ can be obtained from a RAM look-up table using a qualified measurement, or can be obtained based on the previous sample using the predicted estimate of position. Both $\bar{x}_2$ and $\bar{x}_3$ and their associated products can be pre-calculated based on the previous sample. The value $v_c$ can be looked up from a table one sample ahead by using the predicted position estimate.

Velocity Profile

For the velocity loop, the function $f(y_e)$ is a velocity profile stored in RAM or computed as needed, and its value is a function of the distance to go, $y_e$. The control, u, calculated by microprocessor 114 is given by:

$$u = k_2[f(y_e) - \hat{x}_2] - \hat{x}_3$$

The estimated velocity, $\hat{x}_2$, is used, so that a velocity measurement is not required. The velocity error which is the difference between the velocity command, $f(y_e)$, and the estimated velocity, $\hat{x}_2$, is multiplied by the velocity gain constant $k_2$. A value equivalent to the estimated bias, $\hat{x}_3$, is subtracted from the control to compensate for the actual bias applied to the plant.

The velocity profile $f(y_e)$ is a function of the present head position and the desired head position and typically has a low velocity region where the relationship between position and velocity is linear. The velocity profile provides a smooth way to move to the desired track in a time-optimal or near time-optimal manner. A velocity profile is conventionally stored in a RAM look-up table for its entire range including linear and non-linear regions.

In the present invention, the velocity profile is computed, rather than retrieved from RAM 112, in the linear region low-velocity portion. It is computed at each sample by the microprocessor 114. This technique has three benefits over conventional look-up table methods: it results in a smoother velocity profile near the transition between the seek mode and the track following mode; it provides a more consistent entry velocity to the track following mode; and provides improved position settling performance.

The disc drive is operating in a seek mode when the head is moving from one track to a different track. The drive is operating in a track following mode when it has moved to a particular track after executing a seek. During a seek, when the selected head 106 is moved close to the target track, the system is switched to track following mode. This mode is generally present when the number of tracks to go, $y_e$, is less than one track. In the seek mode the velocity command $f(y_e)$, given by the near time-optimal equations given in *Digital Control of Dynamic Systems,* Franklin, Powell, and Workman, Addison-Wesley (1990), herein incorporated by reference.

In the track following mode, the velocity command is replaced by the expression, $$f(y_e) = (k_{1tf}/k_{2tf})(r - \hat{x}_1)$$

where r = desired target position. The velocity gain constant, $k_2$, in the calculation of the control, u, in seek mode, is replaced by the corresponding gain constant, $k_{2tf}$, during track following mode, so that the control, u, is given by $$\begin{aligned} u &= k_{2tf}[f(y_e) - \hat{x}_2] - \hat{x}_3 \\ &= -k_{1tf}(\hat{x}_1 - r) - k_{2tf}\hat{x}_2 - \hat{x}_3. \end{aligned}$$

The subscript "tf", in the above expressions, refers to the track following mode. In the track following mode, the actuator current is normally very small compared to the seek mode actuator current. Under these conditions, the power amplifier gain, $k_{pa}$, is reduced to a low-gain mode in order to improve the resolution of the applied actuator current and therefore the track following accuracy. However, if the magnitude of the control, u, is sufficiently large to saturate the power amplifier for the low-gain mode, then the high-gain mode can be switched back to allow higher capture current for one or more sample periods which increases the likelihood of capturing the desired track. The selection of high-gain or low-gain modes in track following mode is selected based on the magnitude of the control, u, applied. If u, is small, then a high gain may be applied, however, if u is large, then the low gain may be required to prevent nonlinearity and saturation. In this invention it is possible to switch from high-gain mode to low-gain mode, or from low-gain mode to high-gain mode at any time. In one embodiment of the invention, the gain is changed by a factor of approximately 5 to 1 between the modes.

When switching from between seek and track follow modes or between track follow and seek modes, several steps are generally taken to avoid undesirable switching transients. The two modes use different scale factors for state variables ($k_{a1}$ for u, $k_{s2}$ for $\bar{x}_2$, and $k_{s3}$ for $\bar{x}_3$), different power amplifier gains ($k_{patf}$ and $k_{pask}$), and different feedback gains, K. First, the state-space variables, $\bar{x}_2$, $\bar{x}_3$, and u, must be rescaled to ensure a smooth transition of the actual physical state-space variables such as position, velocity and acceleration when the scale factors and power amplifier gain are changed. Second, the control, u, can be compensated for the discontinuity due to different feedback gains. This control compensation can be accomplished by using a software flag to indicate that a compensation value should be added to the control. The compensation value is a function of the feedback gains and scale factors used in both seek and track following modes. A different compensation value is used for each mode.

The equations used for switching between the two modes are shown below:

$$\bar{x}_{2tf} = (yscale_{tf}/yscale_{sk}) \times (k_{s2tf}/k_{s2sk}) \times \bar{x}_{2sk}$$

$$\bar{x}_{3tf} = (k_{s1tf}/k_{s1sk}) \times (k_{s3tf}/k_{s3sk}) \times (k_{pask}/k_{patf}) \times \bar{x}_{3sk}$$

$$u_{tf} = (k_{s1tf}/k_{s1sk}) \times (k_{pask}/k_{patf}) \times u_{sk}$$

At the switch point from high gain to low gain, the control can also be compensated for the discontinuity due to different feedback gains. This is done by using a software flag to add a value of $u_{comp}$ to the track following mode control.

$$u = u_{tf} + u_{comp}$$

where $u_{comp}$ is the conversion of state space variables and the control compensation when switching modes will result in significant improvement for settling time.

Estimator and Controller Algorithm of the Track Following Mode

Figure 13:
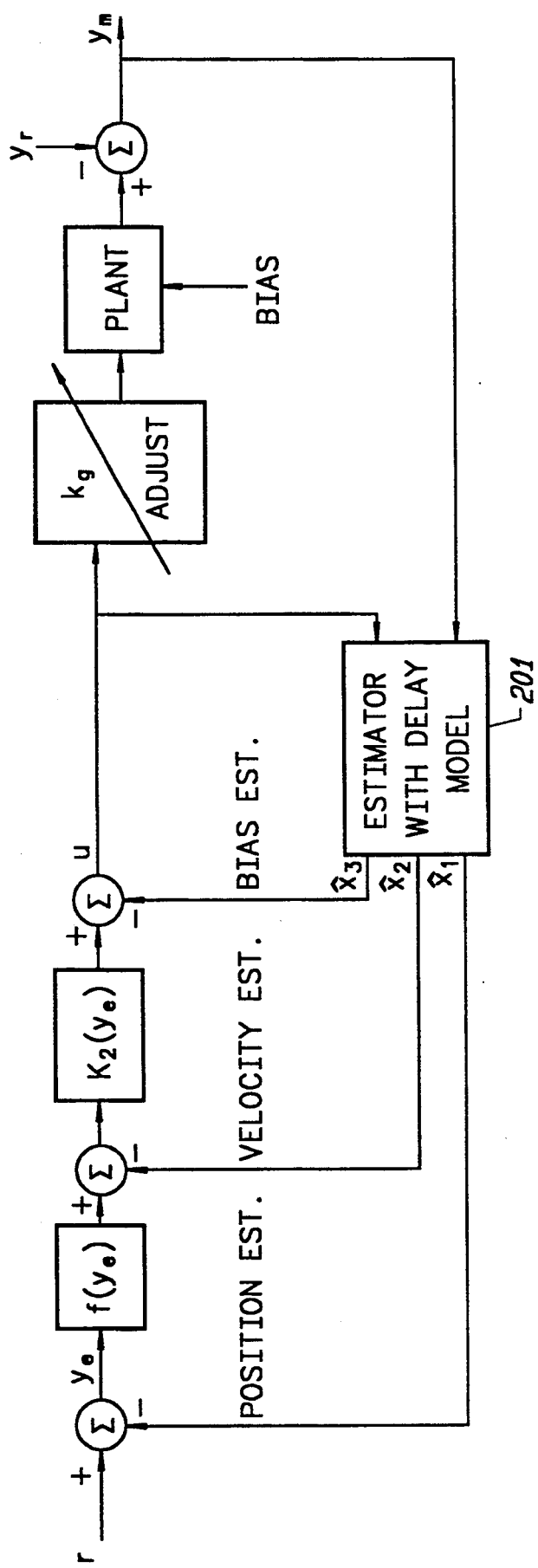
FIG. 13 is an illustration which shows a block diagram of the digital servo control system according to an embodiment of the present invention.

FIG. 13 is an illustration which shows a block diagram of the digital servo control system according to an embodiment of the present invention. The estimator 201 is a full-order estimator and estimates the states of the plant including: the position of the selected head, $\hat{x}_1$, the velocity of the selected head, $\hat{x}_2$, and the bias, $\hat{x}_3$, at the plant input 202. The current estimated states $\hat{x}_1$, $\hat{x}_2$, and $\hat{x}_3$, are a function of the predicted states, $\bar{x}_1$, $\bar{x}_2$, and $\bar{x}_3$, and the position measurement, $y_m$. The measured position, $y_m$, is a 32-bit number. It may be determined using conventional methods or by the method disclosed herein based on the Gray code value and the digitized PES value by the Precision Head Position Measurement Procedure (PHPMP) described elsewhere in this disclosure.

The nomenclature used in the block diagram of FIG. 13 for the signals and states is as follows:

r = desired position, in tracks;
$\hat{x}_1$ = estimated position, in tracks;
$\hat{x}_2$ = estimated velocity, in tracks/sample period;
$\hat{x}_3$ = estimated bias, in amperes;
$y_e = r - \hat{x}_1$ = position error, in tracks to go;
$f(y_e)$ = velocity command, in tracks/sample period;
$y_m$ = position measurement, in tracks;
$y_r$ = track following command input, in tracks;
$f(y_e) - \hat{x}_2$ = velocity error, in tracks/sample period.

Because of noise or defects on the magnetized disc surface, either or both of the Gray code and the PES signal may be erroneous at some times. Therefore, even though the head position is measured, a head position estimate is also calculated by the estimator 201. This estimated value is used to filter the measurement noise; to qualify the measurement; and to replace clearly erroneous measurements which may occasionally occur because of noise or defects.

A position measurement is qualified by comparing the measured position with a predicted position estimate and a tolerance value. If the measurement is such that it is outside the tolerance bounds of the predicted position, then the measurement will be discarded. The tolerance bound may be made larger for the next sector to prevent too many consecutive mismatches. If there are too many consecutive mis-matches, a procedure may be implemented wherein the system will perform a recalibration procedure and re-seek the target track. For example, if there are three consecutive mismatches, the servo system recalibrates and re-seeks. In an embodiment of the invention, the measurement qualification tolerance window is one track for track seek mode, $\frac{3}{4}$ track for capture mode, and $\frac{1}{4}$ of a track width for track following mode. Track capture mode occurs between the termination of seek mode, and prior to the beginning of on-track mode; it is a transition mode.

The predicted states $\bar{x}_1(k+1)$, $\bar{x}_2(k+1)$, and $\bar{x}_3(k+1)$, at time sample increment $k+1$, are a function of the current estimated states $\hat{x}_1(k)$, $\hat{x}_2(k)$, and $\hat{x}_3(k)$, at time sample increment k, the current control value, $u = u_k = u(k)$, and the last control value $u_{k-1} = u(k-1)$. The inclusion of the last control value $u_{k-1}$ is to compensate for the computational delay between the time the measurement is available and the time the control signal is output. Another use for the delay is to include additional phase lags in the system unaccounted for in the estimator model. The estimator model does not generally include phase lags because the estimator model cannot be too complex due to limited micro-controller 110 bandwidth.

The estimator model for computing the estimated states $\hat{x}_1$, $\hat{x}_2$, and $\hat{x}_3$, are based on a simplified model of the plant. The plant consists of the A/D converter 108, PWM D/A 132, low-pass filter 134, power amplifier 135, actuator 104, head 105, demodulator 102, head pre-amplifier 101 and the servo data logic 133. A model of the plant which includes a plant gain constant, $k_p$, is used in the design of the estimator 201. The actual plant gain constant, $k_p$, used in the estimator, may be different from the gain constant, $k_{p-nominal}$, because of modeling error or limitations, component tolerance, temperature, humidity, and component aging. A plant gain adjustment factor, $k_g$, is defined such that $k_p = k_g \times k_{p-nominal}$.

The manner in which the actual plant gain constant, $k_p$, can be calibrated using a time-averaging technique, and thus provide a means to adaptively change the control, u, to compensate for this difference between the gain constants is described subsequently.

In reference to the FIG. 11 block diagram, there are also shown a plant block, and an estimator block. The plant and estimator to which the methods of this invention pertain may be of a conventional type. The general control law theory applied to the plant may also be conventional. However, in order that the present invention be more clearly understood, mathematical descriptions for a plant, such as a head actuator servo system, an estimator, and control law are described briefly below.

Plant Model

The plant consists of the PWM gain, the PWM filter, the power amplifier, the actuator and head dynamics, the demodulator and the A/D converter and its normalizing constant. The plant gain is given by a function of individual plant components. In this embodiment, the plant gain constant is given by:

$$k_p = (k_{dac} \times k_{pa} \times k_t \times r_{ad} \times t_{pi} \times k_{demod} \times k_{adc} \times k_{norm})/j_t$$

where
- $k_{dac}$ = D/A gain in V/dac counter,
- $k_{pa}$ = power amplifier gain in A/V,
- $k_t$ = torque constant in N-m/A,
- $r_{ad}$ = head radius in inches,
- $t_{pi}$ = tracks per inch,
- $k_{demod}$ = demodulation gain in V/track,
- $k_{adc}$ = A/D gain in ADC count/V,
- $k_{norm}$ = PES normalizing constant, and
- $j_t$ = total inertia in kilogram-m².

Figure 14:
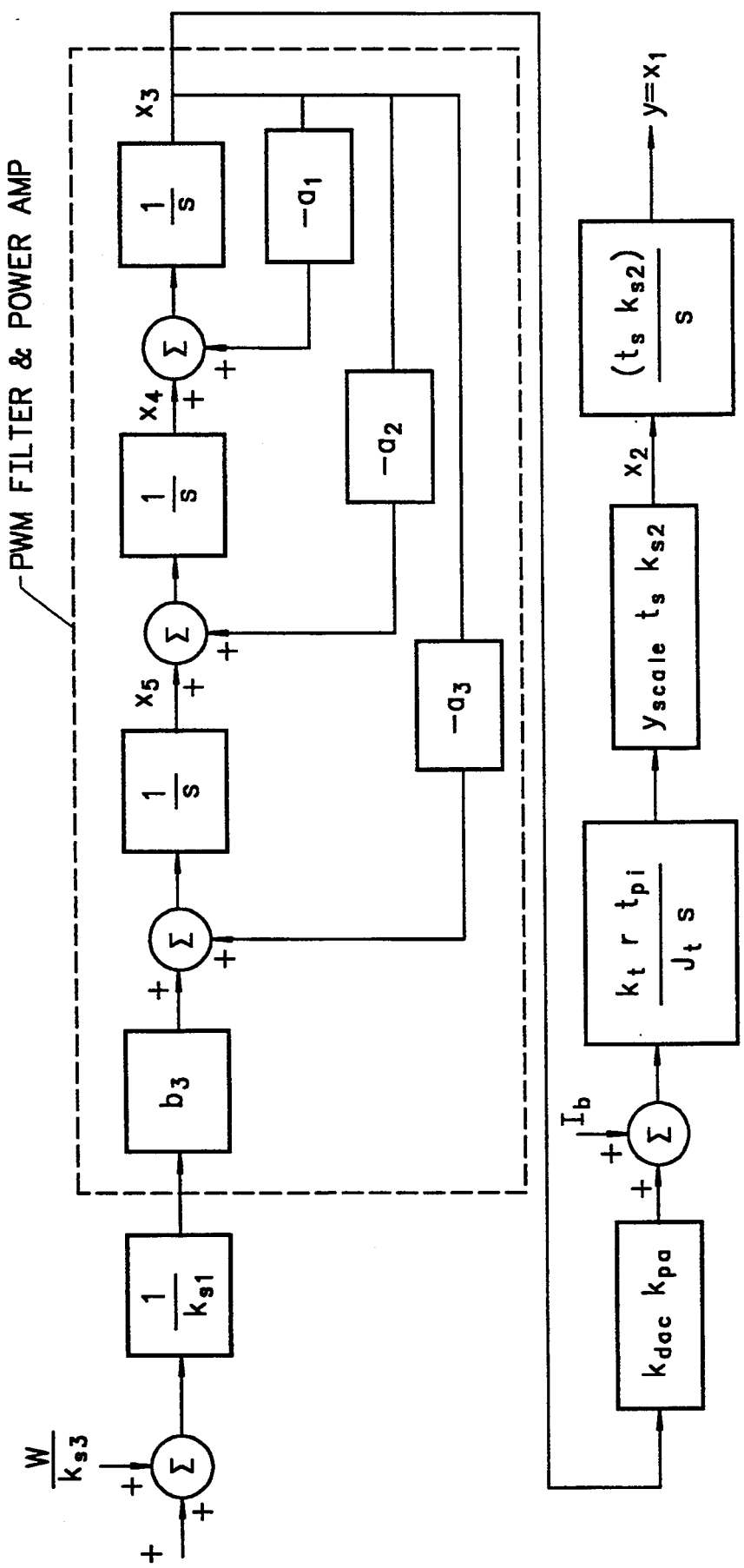
FIG. 14 is an illustration which shows a model for the continuous plant in an observer canonical form.
Figure 15:
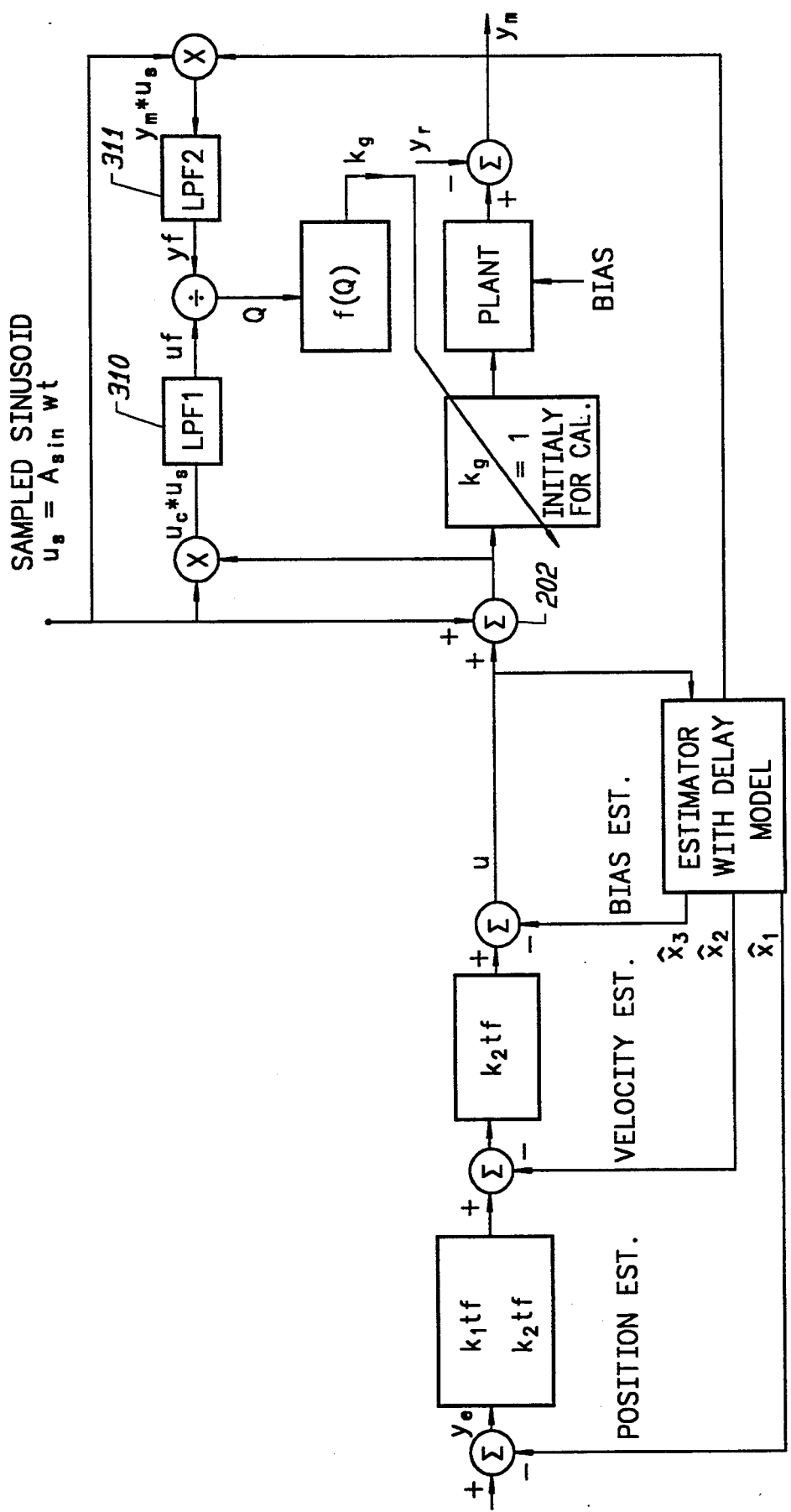
FIG. 15 is an illustration which shows a block diagram of a servo system during a calibration.

A model for the continuous plant in an observer canonical form is shown in FIG. 14 where $k_{s1}$, $k_{s2}$, and $k_{s3}$ are scale factors, and $t_s$ is the sampling period. The digital servo block diagram is shown in FIG. 15.

Estimator Model

To reduce the number of computations, the estimator model assumes a double integrator plant with bias and delay. A double integrator plant model is suitable for a disc drive head actuator because of low viscous and coulomb friction, except for the PWM filter and power amplifier phase characteristics. The effect of phase loss due to the PWM filter and the power amp is approximated in the estimator by an additional 70 microseconds of delay for a double integrator plant. The derivation of the estimator equations is shown below initially for a continuous system without bias and then augmented for a system with bias.

For a continuous plant with no bias, the estimator equations may be derived as follows:

$$A_c = [0 \quad 1/(k_{s2} \times t_s);$$
$$\quad 0 \quad 0 \quad]$$

$$B_c = [0 \quad k_{s2} \times k_p \times t_s/k_{s1}]'$$

$$C_c = [1 \quad 0]$$

The equations may be augmented for a system with bias $$w = x_3/k_{s3}$$

where $k_{s3}$ is a scale factor for the bias such that:

$$A_{ce} = [A_c \quad B_c/k_{s3};$$
$$\quad 0 \quad 0]$$

$$B_{ce} = [B_c; 0]$$

$$C_{ce} = [C_c \quad 0]$$

The current estimator equations with bias but without delay are given by:

$$\hat{x}(k) = \bar{x}(k) + L \times [y_m(k) - C_e \times \bar{x}(k)]$$

$$\bar{x}(k+1) = A_e \times \hat{x}(k) + B_{e1} \times u(k) + B_{e2} \times u(k-1)$$

where
- $C_e = [1 \quad 0 \quad 0]$;
- $\bar{x}$ = predicted est. of position, velocity, and bias;
- $\hat{x}$ = current est. of position, velocity, and bias;
- L = estimator gain vector;
- $\lambda$ = time delay between measurement and control output;

$$A_e = \exp[A_{ce}T]$$

$$B_{e1} = \int_0^{T-\lambda} \exp[A_{ce}t] B_{ce} dt$$

$$B_{e2} = \int_{T-\lambda}^{T} \exp[A_{ce}t] B_{ce} dt$$

Both $\bar{x}$ and $\hat{x}$ are outputs of the same estimator system. The estimator roots are given by the characteristic equation:

$$det[(z \times I) - (A_e + L \times C_e \times A_3)] = 0$$

where I is the identity matrix, and the gain vector can be found using Ackermann's formula:

$$L' = \text{Ackermann}(A_e', A_e' \times C_e', z_e)$$

where $z_e$ is the vector of the estimator poles which are the roots of the above estimator characteristic equation.

Control Law

Both seek and track following modes can be represented by the servo block diagram of FIG. 13. The seek mode uses the Proximate Time-Optimal Servomechanism (PTOS) equations which are conventional and can be found in standard texts.

For seek mode operation outside the linear region, $y > y_{linear}$, the velocity command is given by:

$$f(y_e) = sgn(y_e)[(4 \times m \times k_1/k_2^2) \times abs(y_e) - m/k_2]$$

where,
- $sgn(y_e)$ = signum function of $y_e$,
- $abs(y_e)$ = absolute value of $y_e$,
- $k_1$ = control gain for position; and
- $k_2$ = control gain for velocity.

For seek mode operation within the linear region, $y < y_{linear}$, the equation for $f(y_e)$ is:

$$f(y_e) = k_{1sk}/k_{2sk}$$

where,
- $k_{1sk}$ = control gain for position during seek, and
- $k_{2sk}$ = control gain for velocity during seek.

During track following, the function $f(y_e)$ is replaced by:

$$f(y_e) = k_{1tf}/k_{2tf}$$

where, $k_{1f}$ control gain for position during track follow; and
$k_{2f}$ control gain for velocity during track follow.

The linear model will be used to study time and frequency responses of the servo system. The linear control law is given by:

$$u(k) = -K \times x(k) + k_1 \times r(k)$$

where $$K = [k_1 \; k_2 \; 1/k_3]$$

and where $k_1$ and $k_2$ are state feedback gains, and $k_3$ is the scale factor for the estimated bias.

The dual control loop design is used to allow individual optimization of the control gain vector, K, and estimator gain vector, L, for each loop. Thus, the velocity and position control loops can be designed and optimized separately without affecting the other loop. In the seek mode, the performance which is primarily characterized by the access time which is determined by the closed-loop response from the reference input (target command), r. On the other hand, in the track following mode, the performance is dominated by the closed-loop response from the track following command input (or measurement noise response), $y_r$. In both modes, the estimated bias, $x_3$, is subtracted from the control, u, to remove the effect of all bias components imposing on the system.

In an embodiment of the invention, the acceleration discount factor, alpha, is selected to be 0.741, and the saturation maximum value, m_noscale, is selected to be 85, for good deceleration current margin.

The system operates in seek mode until the distance to go is less than $y_{linear}$. It operates in the linear region where the velocity command is no longer looked up in RAM, but calculated on-line using position resolution of equivalent to that of the A/D. When the number of tracks to go is less than one track, then the servo switches to capture mode. When the settle criteria is met, capture is completed and data read/write operations are enabled.

Closed-Loop System for the Plant and Estimator

By matrix manipulation, the complete closed-loop system for the 6th-order plant and the 3rd-order estimator shown above can be described by the 9th-order three-input single-output state-space system equations:

$$X_s(k+1) = A_s \times X_s(k) + B_s \times u_s(k)$$

$$y_s(k) = C_s \times X_s(k) + D_s \times u_s(k)$$

where $X_s = [X(k)' Z(k)']'$ $Z(k) = x(k) - L \times y_m(k)$
$\phantom{Z(k)} = x(k) - L \times C_p \times X(k) + L \times y_r(k)$ $U_s(k) = [y_r(k) r(k) w(k)]'$ $y_s(k) = y(k)$ $A_s = [A_p - B_p \times K \times L \times C_p \quad -B_p \times K;$ $\phantom{A_s = [} M \times (A_e - B_{e1} \times K) \times L \times C_P + M \times B_{e2} \times C_w$ $\phantom{A_s = [} M \times (A_e - B_{e1} \times K)];$ -continued $B_s = [ \quad B_p \times K \times L \quad k_1 \times B_p \quad B_w;$ $\phantom{B_s = [} -M \times (A_e - B_{e1} \times K) \times L \quad k_1 \times M \times B_{e1} \quad zeros(3,1)];$ $C_s = [1 \quad zeros(1,8)]$ $D_s = zeros(1,3)$ where zeros(re, n) is a zero vector of dimension m by n.

The system poles can be found by solving the characteristic equation:

$$det(zI - A_s) = 0.$$

The closed-loop frequency response and the step response due to any of the three inputs $y_r$, r or w can be found using standard mathematical techniques or CAD routines.

The open-loop transfer function, $-Y(jw)/Y_m(jw)$, can be found by letting $$r = w = 0$$

and rewriting the system equation to be of the following form:

$$X_{ol}(k+1) = A_{ol} \times X_{ol}(k) + B_{ol} \times u_{ol}(k)$$

$$y_{ol}(k) = C_{ol} \times X_{ol}(k)$$

where:
$X_{ol} = X_s$
$U_{ol} = y_m$
$y_{ol} = -y$
$A_{ol} = A_s + B_s(:,I) \times C_s$
$B_{ol} = -B_s(:,I)$
$C_{ol} = -C_s$; and
$B_s(:,I)$ denotes the 1st column of the matrix $B_s$.

The error transfer function $Y_m(jw)/Y_r(jw)$ and the error step response can also be calculated by letting $r = w = 0$ and rewriting the system equation to be in the form:

$$X_{err}(k+1) = A_{err} \times X_{err}(k) + B_{err} \times u_{err}(k)$$

$$y_{err}(k) = C_{err} \times X_{err}(k) + d_{err} \times u_{err}(k)$$

where
$X_{err} = X_s$
$A_{err} = A_s$
$B_{err} = B_s(:,1)$
$u_{err} = y_r$
$y_{err} = y_m$
$C_{err} = C_s$
$d_{err} = -1$.

Plant Gain Constant Identification Method

Figure 16C:
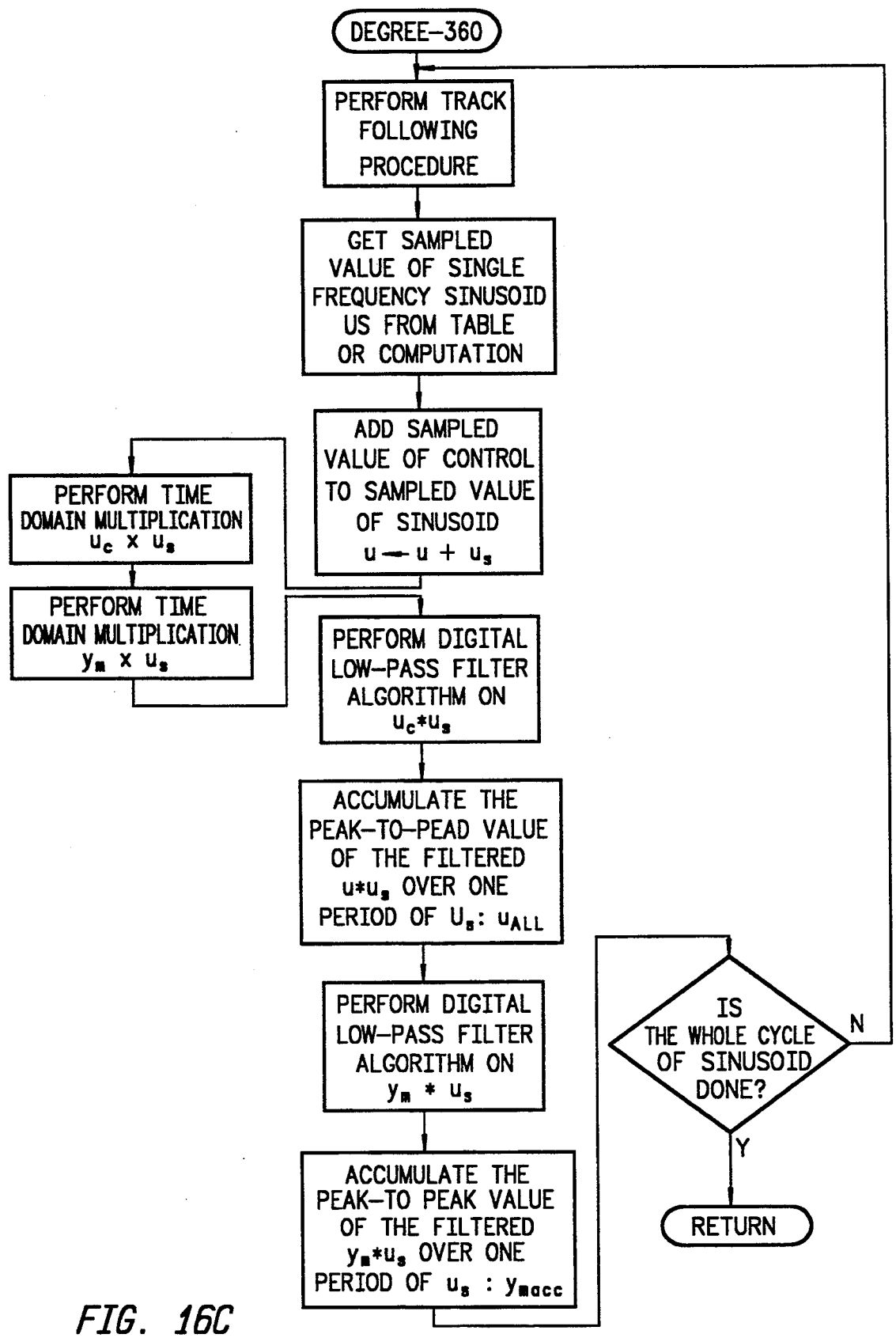
FIGS. 16(A-C) is an illustration which shows a flow diagram of the Adaptive On-line Calibration Procedure (AOCP) for Plant Gain Constant Identification.

The method for calculating the plant gain adjustment factor, $k_g$, involves modulating or equivalently multiplication of digital signal values. It is well suited for microprocessor implementation. FIG. 16 is an illustration which shows a block diagram of the system during a calibration.

The purpose of the calibration algorithm is to identify the plant transfer function, H, and based on this, calculate a plant gain adjustment factor, $k_g$. The calculated plant gain adjustment factor, $k_g$, is then be used to perform on-line adjustments to compensate for the variation in the plant gain. The calibration is performed whenever necessary, and may be done whenever the disc drive is in track following mode and idle, during a power-on reset, during a rezero procedure (seek to reference track 0), whenever the servo encounters an error, or during recalibration. The variation in the plant gain constant, $k_p$, can be caused by a change in any one or more of the following Parameters: the D/A converter or PWM converter gain, PWM low-pass filter gain, power amplifier transconductance gain, torque constant, actuator inertia, head radius, track pitch, sampling period, demodulator gain, and A/D converter gain among others.

FIG. 16 is an illustration which shows a flow diagram of the Adaptive On-line Calibration Procedure (AOCP). The calibration algorithm is comprised of five steps which are described below.

AOCP Step 1. Seek to the center of a zone of tracks to be calibrated, assuming a unity plant gain adjustment factor, $k_g = 1$. For a given head, the disc can be considered a single zone or can be divided into several zones for the purpose of plant gain calibration. For example, actuator torque constant is a parameter which may vary as a function of track location.

AOCP Step 2. At every servo sample while track following, a sampled single-frequency sinusoid, $u_s$, at a frequency w, is added to the control, u, as shown in the block diagram of FIG. 16. Either the signal u or $u_c$ of FIG. 16 can be sent to the estimator. However, using u for the estimator will excite the estimator error. The resulting value, $u_c$, is then multiplied with the sampled sinusoid, $u_s$. The measurement for this sample, $y_m$, is also multiplied with the same sampled sinusoid, $u_s$. The sampled value of the single-frequency sinusoid may generally be stored in a look-up table memory. The multiplication in the time domain corresponds to modulation in frequency domain and therefore results in a zero or DC frequency component as well as undesirable high-frequency components. The mathematical equations in the time domain for the signals described are:

$$u_s = A_1 \times \sin(wkT)$$

$$u_c = A_2 \times \sin(wkT + p_1) + dc_1 + noise$$

$$y_m = A_3 \times \sin(wkT + p_2) + dc_2 + noise$$

$$u_s \times u_c = (A_1 A_2)/2 \times [\cos(p_1) - \cos(2wkT + p_1)] + A_4 \sin(wkT)$$

$$u_s \times y_m = (A_1 A_3)/2 \times [\cos(p_2) - \cos(2wkT + p_2)] + A_5 \sin(wkT)$$

where $dc_1$ and $dc_2$ are the low-frequency or DC components of the signals, $p_1$ is the phase associated with the product $u_s \times u_c$, $p_2$ is the phase associated with the product $u_s \times y_m$, and $A_1$ through $A_5$ are constants. The noise term is contributed by components such as A/D quantization noise, track run-out and track mis-registration. The noise effect can be practically eliminated by proper selection of the test frequency and the bandwidth and order of the low-pass filter.

AOCP Step 3. Apply the multiplied result $u_s \times u_c$ to a digital low-pass filter 310 and the multiplied result $u_s \times y_m$ to a digital low-pass filter 311 so that the DC components $dc_1$ and $dc_2$ components of the modulation results are retained at the outputs of the filters 310, 311. The digital low-pass filters can be any of numerous types such as an integrator or a Butterworth type. This will remove the high frequency noise from the multiplied results and keep only the desired coherent information needed for compensation:

$$u_f = F_{Lp}(u_c \times u_s) = A_1 A_2 \cos(p_1)/2$$

$$y_f = F_{Lp}(y_m \times u_s) = A_1 A_3 \cos(p_2)/2$$

where $F_{Lp}$ represents the low-pass filter operation on the signal. Significantly, even if the system has a low frequency bias, the low-frequency or DC component in $u_c$ is removed by the process of modulation and low-pass filtering.

AOCP Step 4. Calculate the ratio of the two low-pass filter outputs:

$$\begin{aligned} Q &= y_f/u_f = (A_3/A_2) \times [\cos(p_2)/\cos(p_1)] \\ &= (A_3/A_2) \times [\cos(p_2 - p_1) - \tan(p_1) \times \sin(p_2 - p_1)] \end{aligned}$$

The signal $y_f$ is the output of the plant, while the signal $u_f$ is the input to the plant. Therefore, the ratio of $y_f/u_f$, represents the plant gain. From the above expression, it will be observed that the plant gain, $|H(jw_s)|$, at the frequency $w_s$, is proportional to the ratio of the filter outputs, Q. If the output and input of the plant are in phase, then $p_2 = p_1$ and, $$\begin{aligned} Q &= (A_3/A_2) \times [1 - \tan(p_1) \times \sin(0)] \\ &= (A_3/A_2) \end{aligned}$$

so that Q is a maximum positive number.

If the output and input are 180 degrees out of phase, then $p_2 - p_1 = 180$, and $$\begin{aligned} Q &= (A_3/A_2) \times [\cos(p_2 - p_1) - \tan(p_1) \times \sin(p_2 - p_1)] \\ &= (A_3/A_2) \times [\cos(180) - \tan(p_1) \times \sin(180)] \\ &= -A_3/A_2 \end{aligned}$$

so that Q is a minimum negative number.

With this algorithm, a very sharp cut-off low-pass filter is not required. If a very low bandwidth or a very sharp cut-off filter characteristic were required, the time required to measure the plant gain would be increased.

To improve the accuracy of the plant gain measurement, $y_m$, a few cycles of the sine wave should preferentially be bypassed before sampling in order to allow for the transients of the filter outputs to dissipate. Furthermore, the filter outputs can be processed over one or several sine wave periods, such as by averaging to average out any ripple at the outputs yielding a more precise measurement of the plant.

AOCP Step 5. Knowing the plant gain, $|H|$, the plant gain adjustment factor, $k_g$, can be calculated and then applied to the plant to compensate for the plant gain change from the nominal. In other words, the product of $k_g$ and the plant gain, $|H|$, will be equal to the modeled (theoretical) plant gain, $|H_{model}|$, used by estimator.

Resonance Frequency Determination and Cancellation Procedure

The plant phase, in addition to the plant gain, can also be measured in conjunction with this technique by phase shifting. For example, the plant input, $u_c$, may be phase shifted (i.e. $p_1 + \Delta p_1$ is the phase of $u_s$ and $u_c$) in such a way that $Q=0$. Under this condition the phase, $p_1$, can be determined from $p_1=90-\Delta p_1$. Next the measurement, $y_m$, may be phase shifted (i.e. $p_2+\Delta p_2$ is the new phase between $u_c$ and $y_m$) in such a way that $1/Q=0$. Under this condition, the phase $p_2$ can be determined from $p_2=90-\Delta p_2$. Thus the plant phase, which is the difference $p_2-p_1$, can be determined.

The plant gain and phase measurement techniques of the present invention can be used to measure the plant transfer function at any frequency. Furthermore, if the sampling rate is high enough to sample the resonance, the actual resonance frequency of the system can be measured by varying the sinusoid frequency in discrete increments over the frequency range of interest until the plant gain is maximum. The frequency at which the plant gain is maximized is the resonance frequency. A system may have one or more resonances, in which case the plant gain may have more than one local maxima. Once the resonance frequency is identified using this technique, a filter such as an adaptive on-line digital notch filter, can then be used to cancel out the effect of the resonance. The digital notch filter can be synthesized either via a look-up table or with coefficients being a function of the resonance frequency.

In one embodiment of the present invention, the code to do calibration is stored in read only memory (ROM) and in random access memory (RAM). In that embodiment, ROM calibration consists of measuring the A/D offset, the D/A offset, and the power amplifier offset in both high and low gain modes. RAM calibration consists of measuring the demodulator offset, measuring the plant gain in track following mode using the time averaging technique.

In the preferred embodiment each of the methods of this invention are implemented concurrently, including the Adaptive Control Procedure (ACP). However, other embodiments may implement a subset of these techniques, or may implement these techniques in conjunction with other control or measurement methodologies.

An advantage of this adaptive method is that it does not require or assume a low bias system. Since the DC components of the plant input and output are removed by filtering the modulation results, the effect of the system bias is also removed.

Another advantage of the identification technique described in this invention is that it is independent of the control and estimator algorithms. The identification procedure will work with a number of controller/estimator schemes such as reduced-order estimator, prediction estimator, current estimator, multi-rate control, PID control, and classical control methods.

Another advantage is that the adaptive control system, according to the present invention, can also generate an adjustment factor for each of the heads. The adjustment factors can be read via the interface bus as well as stored away in a data base, This is a very useful diagnostic tool for manufacturing testing. The data base can be used to keep track of drive variations, maintain quality control, and prevent production problems. The technique can also be used as a tool to measure changes in actuator's torque constant across the disc, and therefore on-line compensation for these changes if necessary.

What is claimed is:

1. In a continuous analog signal control system for a magnetic disc storage device comprising an electromechanical actuator responsive to a command signal, at least one magnetizable rotating disc having disc track position data encoded magnetically thereupon, at least one transducer proximate said rotating disc surface for sensing said magnetic positional data, said transducer being mechanically linked to said actuator and generating a signal related to a measured position $y_m$ in response to said sensed magnetic positional data, and a control system comprising an estimator;
a method of adaptively calibrating a plant gain for regions of said disc and for each of said transducers, by determining a plant gain adjustment factor, said method comprising the steps of:
commanding said actuator to a position r with a control signal u;
generating a single-frequency sinusoid signal $u_s$;
injecting said single-frequency sinusoid signal $u_s$ to said control system so that said single-frequency sinusoid is added to said control signal;
combining said control signal u and said single-frequency sinusoidal signal $u_s$ to generate a corrected control signal $u_c$;
multiplying said control signal and said added sinusoid signal by said sinusoid signal to generate a first product signal;
measuring a position of said transducer $y_m$;
multiplying said measured transducer position by said sinusoid value to generate a second product signal;
low-pass filtering said first product signal to generate a first filtered signal;
low-pass filtering said second product signal to generate a second filtered signal;
dividing said second filtered signal by said first filtered signal to generate an identification ratio Q proportional to the measured plant gain;
determining a new calibrated plant gain adjustment factor $k_g$, said factor being an inverse function of said identification ratio Q;
replacing a previous plant gain adjustment factor by said new calibrated plant gain adjustment factor;
multiplying said control signal $u_c$ by said new calibrated plant gain adjustment factor $k_g$ to obtain an adjusted control signal $u_s$;
wherein said control system automatically compensates for plant bias forces and for changes in effective plant gain.

2. The method as in claim 1, wherein said step of determining said new calibrated plant gain adjustment factor comprises dividing said identification ratio Q by a nominal identification ratio $Q_{nominal}$ to determine said new calibrated plant gain adjustment factor $k_g$.

3. The method as in claim 1, wherein said single-frequency sinusoid is added directly to said control signal u at a control node.

4. The method as in claim 1, wherein said single frequency sinusoid is of the form $u_s=A_1\sin(wt)$.

5. The method as in claim 1, wherein said method includes measuring the plant phase by phase shifting, said phase shifting comprising the steps of:
phase shifting said plant control signal $u_c$, by a first phase shift $\Delta p_1$ so that said identification ratio Q is zero;
phase shifting said transducer position $y_m$ by a second phase shift $\Delta p_2$ so that the reciprocal of said identification ratio $1/Q$ is zero;
computing said plant phase from the difference of said first and second phase shifts.

6. The method of claim 1, wherein said method additionally comprises performing ROM and RAM calibration, said calibration comprising the steps of:
measuring the A/D offset in high and low gain modes;
measuring the power amplifier offset in both high and low gain modes;
measuring the demodulator offset;
measuring the plant gain in track following mode using a time averaging technique; and
compensating each of the theoretical values used in said estimator by said measured values;
whereby the accuracy of said plant gain is improved.

7. The method of claim 5, wherein said method of adaptively calibrating a plant gain includes a method of measuring a plant resonance frequency, said method of measuring a plant resonance frequency comprising:
varying the frequency of said single-frequency sinusoid over a frequency range; and
sampling said plant gain as said frequency is varied at a sampling rate sufficient to detect said resonance frequency.

8. The method of claim 7, wherein said method additionally comprises canceling the effect of a resonance frequency, wherein said method of canceling said resonance effects comprises filtering said resonance frequency.

9. The method of claim 8, wherein said step of filtering said resonance frequency comprises filtering said resonance frequency using an adaptive notch filter.

10. The method of claim 9, wherein said notch filter is a digital filter notch filter.

11. The method as in claim 10, wherein said digital notch filter is implemented in a look-up table.

12. The method as in claim 10, wherein said digital filter is a function of said resonance frequency.

13. In a control system for a magnetic disc storage device comprising an electromechanical actuator responsive to a command signal, at least one magnetizable rotating disc having disc track position data encoded magnetically thereupon, at least one transducer proximate said rotating disc surface for sensing said magnetic positional data, said transducer being mechanically linked to said actuator and generating a signal related to a measured position $y_m$ in response to said sensed magnetic positional data, a control system comprising an estimator, a circuit for detecting pulse signals encoding coarse position information as current track number $T_{cn}$ and demodulating an analog signal to obtain a position error signal related to the fine relative position of said transducer with respect to the center of said track, said system providing said current track number $T_{cn}$, and said position error signal;
a method of linearizing the positioning of said transducer over a seek length spanning a plurality of tracks, said method comprising:
generating a precision linear position output value $y_m$ over said seek length by combining said current track number $T_{cn}$ value, and said position error signal value.

14. The method of claim 13, wherein said generating a precision linear position output value $y_m$, from said current track number $T_{cn}$, and said position error signal value is according to the relations, $$y_m = (2^n \times T_{cn}) + (k_{norm} \times (AD_{mv} - PES)) + AD_{mv},$$

for $T_{cn}$ an even number, and $$y_m = (2^n \times T_{cn}) - (k_{norm} \times (AD_{mv} - PES)) + AD_{mv},$$

for $T_{cn}$ an odd number, where n is said A/D convertor word bit length, $k_{norm}$ is a multiplicative range normalizing constant, PES is the digitized PES value, $T_{cn}$ is the current track number, and $AD_{mv}$ is the mid-point value of the digital output of the A/D converter.

15. The method as in claim 14, wherein said current track number is encoded using a modulo-74 Grey code.

16. In a control system for a magnetic disc storage device comprising an electromechanical actuator responsive to a command signal, at least one magnetizable rotating disc having disc track position data encoded magnetically thereupon, at least one transducer proximate said rotating disc surface for sensing said magnetic positional data, said transducer being mechanically linked to said actuator and generating a signal related to a measured position $y_m$ in response to said sensed magnetic positional data, and a control system comprising an estimator;
a method for maintaining said transducer in a centered position relative to said track, said method comprising the steps of:
reading servo data from said disc;
calculating a position of said transducer from said servo position data;
calculating a predicted position, velocity, and bias, from previous predicted position, velocity, bias, and control values, and current control value;
generating a control value based on said predicted position, velocity, and bias values;
limiting said control value to a Predetermined maximum value;
multiplying said control value by a plant gain adjustment factor $k_g$ to generate a compensated control value;
shifting the level of said compensated control value to a Predetermined range;
generating a compensated control signal in response to said compensated control value;
applying said control signal to an amplifier to drive said actuator;
calculating an estimator error e between said measured transducer position $y_m$ and said Predicted transducer position;
pre-calculating new predicted states for position, velocity, and bias, based on said previous predicted position, velocity, and bias, said estimator error, and said current and previous control values;
updating said control value by replacing the previous control value with the present control value;
repeating said method for each actuator servo interrupt.

17. The method in claim 16, wherein said step of generating a control value based on said Predicted position, velocity, and bias values is accomplished according to the relation $u = a_1 \times y_m + \text{pre\_result}$, where $a_1 = -K$ L, $\text{pre\_result} = (K \times L \times C_e - K) \times \bar{x} + K(1) \times r$, K=control gain, L=estimator gain, and $C_e$ is the output vector that translates the estimated state to the measurement.

18. The method in claim 16, wherein said step of calculating new predicted states is accomplished according to the relations, $$\bar{x}_1 = \bar{x}_1 + b_1 \times \bar{x}_2 + b_2 \times \bar{x}_3 + b_3 \times u + b_4 \times u_{k-1} + b_5 \times e,$$

$$\bar{x}_2 = \bar{x}_2 + b_6 \times \bar{x}_3 + b_7 \times u + b_8 \times u_{k-1} + b_9 \times e, \text{ and}$$

$$\bar{x}_3 = \bar{x}_3 + b_{10} \times e,$$

where $\bar{x}_1$ = predicted position, $\bar{x}_2$ = predicted velocity, $\bar{x}_3$ = predicted bias, e is the estimator error defined above, u is the present control, $u_{k-1}$ is the previous control, $b_1 = A_e(1,2)$, $b_2 = A_e(1,3)$, $b_3 = B_{e1}(1)$, $b_4 = B_{e2}(1)$, $b_5 = L(1) + A_e(1,2) \times L(2) + A_e(1,3) \times L(3)$, $b_6 = A_e(2,3)$, $b_7 = B_{e1}(1)$, $b_8 = B_{e2}(2)$, $b_9 = L(2) + A_e(2,3) \times L(3)$, and $b_{10} = L(3)$.

19. The method of claim 17, wherein said method additionally comprises the step of pre-calculating said pre_result value after said step of updating said control value so that said pre_result value is available for a subsequent execution of said method.

20. The method of claim 16, wherein said method additionally comprises the step of error checking.

21. In a control system for a magnetic disc storage device comprising an electromechanical actuator responsive to a command signal, at least one magnetizable rotating disc having disc track position data encoded magnetically thereupon, at least one transducer proximate said rotating disc surface for sensing said magnetic positional data, said transducer being mechanically linked to said actuator and generating a signal related to a measured position $y_m$ in response to said sensed magnetic positional data, and a control system comprising an estimator;
a method for maintaining said transducer in a centered position relative to said track, said method comprising the steps of:
reading servo data from said disc;
calculating a position of said transducer from said servo position data;
calculating the estimator error e, according to the relations $e = y_m - C_e \times x = y_m - x_1$, where $x_1$ = predicted position, $x_2$ = predicted velocity, and $x_3$ = predicted bias.
calculating a predicted position, velocity, and bias, from previous predicted position, velocity, bias, and control values, and current control value;
generating a control value based on said predicted position, velocity, and bias values;
limiting said control value to a predetermined maximum value;
multiplying said control value by a plant gain adjustment factor $k_g$ to generate a compensated control value;
shifting the level of said compensated control value to a predetermined range;
generating a compensated control signal in response to said compensated control value;
applying said control signal to an amplifier to drive said actuator;
pre-calculating new predicted states for position, velocity, and bias, based on said previous predicted position, velocity, and bias, said estimator error, and said current and previous control values;
updating said control value by replacing the previous control value with the present control value;
repeating said method for each actuator servo interrupt.

22. The method in claim 21, wherein said step of generating a control value based on said predicted position, velocity, and bias values is accomplished according to the relation $u = a_1 \times e + \text{pre\_resultA}$, where $a_1 = -KL$, $\text{pre\_result A} = -K(1) \times (x_1 - r) - K(2) \times x_2 - (1/K_{s3}) \times x_3$, and $k_{s3}$ = a scale factor for the bias estimate.

23. The method in claim 21, wherein said step of calculating new predicted states is accomplished according to the relations, $$\bar{x}_1 = \bar{x}_1 + b_1 \times \bar{x}_2 + b_2 \times \bar{x}_3 + b_3 \times u + b_4 \times u_{k-1} + b_5 \times e,$$

$$\bar{x}_2 = \bar{x}_2 + b_6 \times \bar{x}_3 + b_7 \times u + b_8 \times u_{k-1} + b_9 \times e, \text{and}$$

$$\bar{x}_3 = \bar{x}_3 + b_{10} \times e,$$

where $\bar{x}_1$ = predicted position, $\bar{x}_2$ = predicted velocity, $\bar{x}_3$ = predicted bias, e is the estimator error defined above, u is the present control, $u_{k-1}$ is the previous control, $b_1 = A_e(1,2)$, $b_2 = A_e(1,3)$, $b_3 = B_{e1}(1)$, $b_4 = B_{e2}(1)$, $b_5 = L(1) + A_e(1,2) \times L(2) + A_e(1,3) \times L(3)$, $b_6 = A_e(2,3)$, $b_7 = B_{e1}(1)$, $b_8 = B_{e2}(2)$, $b_9 = L(2) + A_e(2,3) \times L(3)$, and $b_{10} = L(3)$.

24. The method of claim 22, wherein said method additionally comprises the step of pre-calculating said pre_resultA value after said step of updating said control value so that said pre_resultA value is available for a subsequent execution of said method.

25. The method of claim 15, wherein said method additionally comprises the step of error checking.

26. In a control system for a magnetic disc storage device comprising an electromechanical actuator responsive to a command signal, at least one magnetizable rotating disc having disc track position data encoded magnetically thereupon, at least one transducer proximate said rotating disc surface for sensing said magnetic positional data, said transducer being mechanically linked to said actuator and generating a signal related to a measured position $y_m$ in response to said sensed magnetic positional data, and a control system;
a method for maintaining said transducer in a centered position relative to said track, said method comprising the steps of:
reading servo data from said disc;
calculating a position of said transducer from said servo position data;
generating a control value based on a transfer function depending on at least one prior transducer position ym and control value u;
limiting said control value to a predetermined maximum value;
multiplying said limited control value by a plant gain adjustment factor $k_g$ to generate a compensated control value;
shifting the level of said compensated control value to a predetermined range;
generating a compensated control signal in response to said compensated control value;
applying said control signal to an amplifier to drive said actuator;
updating said control value by replacing the previous control value with the present control value;
repeating said method for each actuator servo interrupt.

27. The method in claim 26, wherein said step of generating a control value based on a transfer function depending on at least one prior transducer position ym and control value u, is in accordance with the relation $$u = c_0 \times y_m + \text{pre\_resultB},$$

where pre_resultB is of the general form $$pre\_resultB = c_1 y_m(k) + c_2 y_m(k-1) + \ldots \\ + c_m y_m(k-n+1) - d_1 u(k) - d_2 u(k-1) - \ldots \\ - d_m u(k-n+1).$$

28. The method of claim 27, wherein said method additionally comprises the step of pre-calculating said pre_resultB value after said step of updating said control value so that said pre_resultB value is available for a subsequent execution of said method.

29. The method of claim 26, wherein said method additionally comprises the step of error checking.

30. In a control system for a magnetic disc storage device comprising an electromechanical actuator responsive to a command signal, at least one magnetizable rotating disc having disc track position data encoded magnetically thereupon, at least one transducer proximate said rotating disc surface for sensing said magnetic positional data, said transducer being mechanically linked to said actuator and generating a signal related to a measured position $y_m$ in response to said sensed magnetic positional data, and a control system;
    a method for switching among a plurality of amplifier gain modes, said method for switching comprising the steps of:
    determining a control value that will drive said actuator to a commanded position;
    switching said gain mode in response to the magnitude of the control value applied;
    adjusting said control system in response to said selected gain mode.

31. The method of claim 30, wherein said adjusting comprises altering control system scale factors for each state variable characterizing said control system, said actuator amplifier gains, and said feedback gains in response to said selected amplifier gain mode.

32. The method in claim 30, wherein said plurality of actuator drive modes consists of a high-gain mode and a low-gain mode.

33. The method in claim 32, wherein said actuator velocity command has the form $f(y_e) = (k_{1tf}/k_{2tf}) \times (r - x_1)$, in said low-gain mode.

34. The method of claim 31, wherein said step of adjusting said control system scale factors for each state variable characterizing said control system, said actuator drive power amplifier gains, and said feedback gains in response to said selected drive mode is according to the relationships $$x_{2tf} = (yscale_{tf}/yscale_{sk}) \times (k_{s2tf}/k_{s2sk}) \times x_{2sk}$$

$$x_{3tf} = (k_{s1tf}/k_{s1sk}) \times (k_{s3tf}/k_{s3sk}) \times (k_{pask}/k_{patf}) \times x_{3sk}$$

$$u_{tf} = (k_{s1tf}/k_{s1sk}) \times (k_{pask}/k_{patf}) \times u_{sk}.$$

35. The method of claim 30, wherein said method additionally comprises the step of adding a compensation value to said control for compensating said control for feedback gain discontinuity, said compensation value is being dependent on said drive mode, said feedback gains, and said scale factors.

36. The method of claim 34, wherein said method additionally comprises the step of adding a compensation value to said control for compensating said control for feedback gain discontinuity, said compensation value is being dependent on said drive mode, said feedback gains, and said scale factors.

37. In a control system for a system having an electromechanical actuator responsive to a command signal, at least one position sensor for sensing actuator positional data, said position sensor being mechanically linked to said actuator and generating a signal related to a measured position $y_m$ in response to said sensed positional data, and a control system comprising an estimator;
    a method of adaptively calibrating a plant gain for regions of said actuator movement and for each of said position sensors, by determining a plant gain adjustment factor, said method comprising the steps of:
    commanding said actuator to a position r with a control signal u;
    generating a single-frequency sinusoid signal $u_s$;
    injecting said single-frequency sinusoid signal $u_s$ to said control system so that said single-frequency sinusoid is added to said control signal;
    multiplying said control signal and said added sinusoid signal by said sinusoid signal to generate a first product signal;
    measuring a position of said actuator $y_m$ based on said position sensor;
    multiplying said measured transducer position by said sinusoid value to generate a second product signal;
    low-pass filtering said first product signal to generate a first filtered signal;
    low-pass filtering said second product signal to generate a second filtered signal;
    dividing said second filtered signal by said first filtered signal to generate an identification ratio Q proportional to the measured plant gain;
    dividing said identification ratio Q by a nominal identification ratio $Q_{nominal}$ to determine a new calibrated plant gain adjustment factor $k_g$;
    replacing a previous plant gain adjustment factor by said new calibrated plant gain adjustment factor;
    multiplying said control signal u by said new calibrated plant gain adjustment factor $k_g$ to obtain a compensated control signal $u_a$;
    whereby said control system is able to automatically compensate for plant bias forces as well as adapt to changes in effective plant gain.

38. The method as in claim 37, wherein said single-frequency sinusoid is added directly to said control signal u at a control node.

39. The method as in claim 37, wherein said control system is a sampled-data control system, and each of said signals is a sampled data signal.

40. A rotating disc storage apparatus having data stored in tracks thereon, said device comprising:
    means for transducing said stored data into a data signal;
    an electro-mechanical actuator movable in response to a control signal, said actuator being mechanically linked to said means for transducing so that said means for transducing is moved from one of said plurality of tracks to another of said plurality of tracks in response to said control signal;
    means for controlling said actuator, said means for controlling generating said control signal which characteristics depend on an adjustable plant gain;
    means for estimating an actuator position, a actuator velocity, and an actuator bias from a measured transducer position and a control signal;
    means for generating a sum signal from an addition of a single-frequency sinusoid to said control signal;

means for modulating said sum signal with said single-frequency sinusoid to generate a modulated control signal;

means for modulating said measured transducer position with said single-frequency sinusoid to generate a modulated position signal;

a low-pass filter for extracting low-frequency components of said modulated control and said modulated position signals;

means for comparing a ratio of said low-pass filtered modulated control signal to said low-pass filtered modulated position signal to generate a plant gain adjustment factor;

means for adjusting a gain characteristic of said means for estimating and said means for controlling in response to said plant gain adjustment factor.

41. A system having an electro-mechanical assembly movable between a plurality of positions in response to a control signal, said system comprising:

means for measuring said assembly position;

means for controlling said assembly, said means for controlling generating said control signal having characteristics depend on an on-line adjustable plant gain;

means for estimating an assembly position, an assembly velocity, and an assembly bias from said measured assembly position and said control signal;

means for generating a sum signal from an addition of a single-frequency sinusoid to said control signal;

means for modulating said sum signal with said single-frequency sinusoid to generate a modulated control signal;

means for modulating said measured actuator position with said single-frequency sinusoid to generate a modulated position signal;

a low-pass filter for extracting low-frequency components of said modulated control and said modulated position signals;

means for comparing a ratio of said low-pass filtered modulated control signal to said low-pass filtered modulated position signal to generate a plant gain adjustment factor;

means for adjusting a gain characteristic of said means for controlling in response to said plant gain adjustment factor.

42. In a sampled-data control system for a magnetic disc storage device comprising an electromechanical actuator responsive to a command signal, at least one magnetizable rotating disc having disc track position data encoded magnetically thereupon, at least one transducer proximate said rotating disc surface for sensing said magnetic positional data, said transducer being mechanically linked to said actuator and generating a signal related to a measured position $y_m$ in response to said sensed magnetic positional data, and a control system comprising an estimator;

a method of adaptively calibrating a plant gain for regions of said disc and for each of said transducers, by determining a plant gain adjustment factor, said method comprising the steps of:

commanding said actuator to a position r with a control signal u;

generating a single-frequency sinusoid signal $u_s$;

injecting said single-frequency sinusoid signal $u_s$ to said control system so that said single-frequency sinusoid is added to said control signal;

combining said control signal u and said single-frequency sinusoidal signal $u_s$ to generate a corrected control signal $u_c$;

multiplying said control signal and said added sinusoid signal by said sinusoid signal to generate a first product signal;

measuring a position of said transducer $y_m$;

multiplying said measured transducer position by said sinusoid value to generate a second product signal;

low-pass filtering said first product signal to generate a first filtered signal;

low-pass filtering said second product signal to generate a second filtered signal;

dividing said second filtered signal by said first filtered signal to generate an identification ratio Q proportional to the measured plant gain;

determining a new calibrated plant gain adjustment factor $k_g$, said factor being an inverse function of said identification ratio Q;

replacing a previous plant gain adjustment factor by said new calibrated plant gain adjustment factor;

multiplying said control signal u by said new calibrated plant gain adjustment factor $k_g$ to obtain an adjusted control signal $u_s$;

wherein each of said signals is a sampled data signal;

wherein said control system automatically compensates for plant bias forces and for changes in effective plant gain.

43. The method as in claim 42, wherein said single-frequency sinusoid is of the form $u_s = A_1 \sin(wkT)$.

44. The method as in claim 42, wherein a plurality of cycles of said signals are bypassed before sampling so that transients of the filter outputs dissipate prior to sampling.

45. The method as in claim 42, wherein said first and second filter signals are signal processed over a plurality of sine wave periods to yield a more precise measurement of the plant characteristic.

46. The method as in claim 45, wherein said signal processing comprises averaging each of said first and second filter signals over a plurality of sine wave periods so that any ripple in said filtered signals is removed.

47. The method as in claim 42, wherein said step of determining said new calibrated plant gain adjustment factor comprises dividing said identification ratio Q by a nominal identification ration $Q_{nominal}$ to determine said new calibrated plant gain adjustment factor $k_g$.

48. The method as in claim 42, wherein said single-frequency sinusoid is added directly to said control signal u at a control node.

49. The method as in claim 42, wherein said method includes measuring the plant phase by phase shifting, said phase shifting comprising the steps of:

phase shifting said plant control signal $u_c$, by a first phase shift $\Delta p_1$ so that said identification ratio Q is zero;

phase shifting said transducer position $y_m$ by a second phase shift $\Delta p_2$ so that the reciprocal of said identification ration 1/Q is zero;

computing said plant phase from the difference of said first and second phase shifts.

50. The method of claim 42, wherein said method additionally comprises performing ROM and RAM calibration, said calibration comprising the steps of:

measuring the A/D offset in high and low gain modes;

measuring the power amplifier offset in both high and low gain modes;

measuring the demodulator offset;

measuring the plant gain in track following mode using a time averaging technique; and compensating each of the theoretical values used in said estimator by said measured values;

whereby the accuracy of said plant gain is improved.

51. The method of claim 50, wherein said method of adaptively calibrating a plant gain includes a method of measuring a plant resonance frequency, said method of measuring a plant resonance frequency comprising:

varying the frequency of said single-frequency sinusoid over a frequency range; and sampling said plant gain as said frequency is varied at a sampling rate sufficient to detect said resonance frequency.

52. The method of claim 51, wherein said method additionally comprises canceling the effect of a resonance frequency, wherein said method of canceling said resonance effects comprises filtering said resonance frequency.

53. The method of claim 52, wherein said step of filtering said resonance frequency comprises filtering said resonance frequency using an adaptive notch filter.

54. The method of claim 53, wherein said notch filter is a notch filter selected from the group consisting of (i) a digital filter notch filter, (ii) a digital notch filter implemented in a look-up table, and (iii) a digital notch filter that filters as a function of said resonance frequency.

55. In a hybrid analog and digital control system for a magnetic disc storage device comprising an electromechanical actuator responsive to a command signal, at least one magnetizable rotating disc having disc track position data encoded magnetically thereupon, at least one transducer proximate said rotating disc surface for sensing said magnetic positional data, said transducer being mechanically linked to said actuator and generating a signal related to a measured position $y_m$ in response to said sensed magnetic positional data, and a control system comprising an estimator;

a method of adaptively calibrating a plant gain for regions of said disc and for each of said transducers, by determining a plant gain adjustment factor, said method comprising the steps of:

commanding said actuator to a position r with a control signal u;

generating a single-frequency sinusoid signal $u_s$;

injecting said single-frequency sinusoid signal $u_s$ to said control system so that said single-frequency sinusoid is added to said control signal;

combining said control signal u and said single-frequency sinusoidal signal $u_s$ to generate a corrected control signal $u_c$;

multiplying said control signal and said added sinusoid signal by said sinusoid signal to generate a first product signal;

measuring a position of said transducer $y_m$;

multiplying said measured transducer position by said sinusoid value to generate a second product signal;

low-pass filtering said first product signal to generate a first filtered signal;

low-pass filtering said second product signal to generate a second filtered signal;

dividing said second filtered signal by said first filtered signal to generate an identification ratio Q proportional to the measured plant gain;

determining a new calibrated plant gain adjustment factor $k_g$, said factor being an inverse function of said identification ratio Q;

replacing a previous plant gain adjustment factor by said new calibrated plant gain adjustment factor;

multiplying said control signal u by said new calibrated plant gain adjustment factor $k_g$ to obtain an adjusted control signal $u_s$;

wherein said control system automatically compensates for plant bias forces and for changes in effective plant gain.

56. The method as in claim 55, wherein said step of determining said new calibrated plant gain adjustment factor comprises dividing said identification ratio Q by a nominal identification ration $Q_{nominal}$ to determine said new calibrated plant gain adjustment factor $k_g$.

57. The method as in claim 55, wherein said single-frequency sinusoid is added directly to said control signal u at a control node.

58. The method as in claim 55, wherein said single-frequency sinusoid is of the form $u_s = A_1 \sin(wkT)$.

59. The method as in claim 55, wherein said method includes measuring the plant phase by phase shifting, said phase shifting comprising the steps of:

phase shifting said plant control signal $u_c$, by a first phase shift $\Delta p_1$ so that said identification ratio Q is zero;

phase shifting said transducer position $y_m$ by a second phase shift $\Delta p_2$ so that the reciprocal of said identification ration $1/Q$ is zero;

computing said plant phase from the difference of said first and second phase shifts.

60. The method of claim 55, wherein said method additionally comprises performing ROM and RAM calibration, said calibration comprising the steps of:

measuring the A/D offset in high and low gain modes;

measuring the power amplifier offset in both high and low gain modes;

measuring the demodulator offset;

measuring the plant gain in track following mode using a time averaging technique; and compensating each of the theoretical values used in said estimator by said measured values;

whereby the accuracy of said plant gain is improved.

61. The method of claim 55, wherein said method of adaptively calibrating a plant gain includes a method of measuring a plant resonance frequency, said method of measuring a plant resonance frequency comprising:

varying the frequency of said single-frequency sinusoid over a frequency range; and sampling said plant gain as said frequency is varied at a sampling rate sufficient to detect said resonance frequency.

62. The method of claim 55, wherein said method additionally comprises canceling the effect of a resonance frequency, wherein said method of canceling said resonance effects comprises filtering said resonance frequency.

63. The method of claim 62, wherein said step of filtering said resonance frequency comprises filtering said resonance frequency using an adaptive notch filter.

64. The method of claim 63, wherein said notch filter is a notch filter selected from the group consisting of (i) a digital filter notch filter, (ii) a digital notch filter implemented in a look-up table, and (iii) a digital notch filter that filters as a function of said resonance frequency.

* * * * *